(12) United States Patent
Okabe

(10) Patent No.: US 8,450,397 B2
(45) Date of Patent: May 28, 2013

(54) GOLF BALL

(75) Inventor: Satoko Okabe, Kobe (JP)

(73) Assignee: Dunlop Sports Co. Ltd., Kobe (JP)

(*) Notice: Subject to any disclaimer, the term of this patent is extended or adjusted under 35 U.S.C. 154(b) by 699 days.

(21) Appl. No.: 12/232,806

(22) Filed: Sep. 24, 2008

(65) Prior Publication Data

US 2009/0082137 A1    Mar. 26, 2009

(30) Foreign Application Priority Data

Sep. 25, 2007  (JP) ................................ 2007-247816
Oct. 5, 2007   (JP) ................................ 2007-262650

(51) Int. Cl.
*A63B 37/12*       (2006.01)
*C08L 67/00*       (2006.01)

(52) U.S. Cl.
USPC ............ 524/12; 524/10; 524/14; 524/35; 524/404; 524/405; 524/413; 524/430; 524/432; 524/433; 524/443; 525/127; 525/130; 525/166; 525/174; 525/175; 525/176; 473/378; 473/385

(58) Field of Classification Search
None
See application file for complete search history.

(56) References Cited

U.S. PATENT DOCUMENTS

| | | | |
|---|---|---|---|
| 4,221,703 A | 9/1980 | Hoeschele | |
| 4,884,814 A | 12/1989 | Sullivan | |
| 4,955,966 A * | 9/1990 | Yuki et al. | 473/359 |
| 5,565,524 A | 10/1996 | Hamada et al. | |
| 5,652,325 A | 7/1997 | Miyazaki et al. | |
| 5,869,578 A | 2/1999 | Rajagopalan | |
| 5,889,114 A | 3/1999 | Statz | |
| 5,935,021 A | 8/1999 | Kashiwagi et al. | |
| 6,037,419 A | 3/2000 | Takesue et al. | |
| 6,174,247 B1 | 1/2001 | Higuchi et al. | |
| 6,274,669 B1 | 8/2001 | Rajagopalan | |
| 6,517,250 B1 | 2/2003 | Ohira et al. | |
| 6,803,443 B1 | 10/2004 | Ariga et al. | |
| 7,091,269 B2 | 8/2006 | Takesue et al. | |
| 7,638,580 B2 | 12/2009 | Sasaki et al. | |
| 2001/0020067 A1 | 9/2001 | Harris et al. | |
| 2002/0096801 A1 | 7/2002 | Puniello et al. | |
| 2004/0028927 A1 | 2/2004 | Leckey et al. | |
| 2004/0209701 A1 | 10/2004 | Finkel | |
| 2004/0235586 A1 * | 11/2004 | Chen | 473/351 |
| 2005/0020783 A1 | 1/2005 | Takesue et al. | |
| 2006/0147695 A1 * | 7/2006 | Serizawa et al. | 428/297.4 |
| 2006/0178471 A1 | 8/2006 | Sasaki et al. | |
| 2006/0205534 A1 | 9/2006 | Egashira et al. | |
| 2007/0026972 A1 * | 2/2007 | Isogawa et al. | 473/378 |
| 2008/0207353 A1 * | 8/2008 | Sullivan | 473/371 |
| 2009/0082137 A1 | 3/2009 | Okabe | |
| 2009/0171037 A1 | 7/2009 | Aoshima et al. | |
| 2009/0311511 A1 | 12/2009 | Obuchi et al. | |
| 2011/0009531 A1 | 1/2011 | Aoshima et al. | |

FOREIGN PATENT DOCUMENTS

| | | |
|---|---|---|
| GB | 2264302 A | 8/1993 |
| JP | 1-308577 A | 12/1989 |
| JP | 5-277208 A | 10/1993 |
| JP | 7-132152 A | 5/1995 |
| JP | 8-182777 A | 7/1996 |
| JP | 10-137364 A | 5/1998 |
| JP | 10-137365 A | 5/1998 |
| JP | 11-500776 A | 1/1999 |
| JP | 11-80522 A | 3/1999 |
| JP | 11-104271 A | 4/1999 |
| JP | 2002-114899 A | 4/2002 |
| JP | 2003-3052 A | 1/2003 |
| JP | 2003-119402 A | 4/2003 |
| JP | 2003-342452 A | 12/2003 |
| JP | 2004-204195 A | 7/2004 |
| JP | 2005-13487 A | 1/2005 |
| JP | 2005029601 * | 2/2005 |
| JP | 2005-60474 A | 3/2005 |
| JP | 2005-60691 A | 3/2005 |
| JP | 2005060556 * | 3/2005 |
| JP | 2005-323637 A | 11/2005 |
| JP | 2005307078 * | 11/2005 |
| JP | 2005-336238 A | 12/2005 |
| JP | 2006028333 * | 2/2006 |
| JP | 2006-96836 A | 4/2006 |
| JP | 2006-205646 A | 8/2006 |
| JP | 2006-218046 A | 8/2006 |
| JP | 2006-247224 A | 9/2006 |
| JP | 2006-341021 A | 12/2006 |
| JP | 2007-29471 A | 2/2007 |
| JP | 2007-254568 A | 10/2007 |
| JP | 2008-264038 A | 11/2008 |
| WO | WO 2006/115226 A1 | 11/2006 |
| WO | WO 2006/121056 A1 | 11/2006 |

(Continued)

OTHER PUBLICATIONS

Thain; Science and Golf IV; 2002; pp. 319-327.*

(Continued)

*Primary Examiner* — David Buttner

(74) *Attorney, Agent, or Firm* — Birch, Stewart, Kolasch & Birch, LLP

(57) ABSTRACT

The present invention provides a golf ball comprising a core and a cover covering the core, wherein the cover is formed from a cover composition containing a non-petroleum based polyester resin as a resin component (A) and a needle-like and/or fibrous filler (B). The present invention further provide a golf ball comprising a core and a cover covering the core, wherein the cover is formed from a cover composition containing, a non-petroleum based polyester resin (A-1), at least one petroleum based thermoplastic resin (A-2), and a compatibilizer (C) containing at least a (meth)acrylic resin (C-1) having a polar functional group and an olefin resin (C-2) having a polar functional group.

According to the present invention, durability, abrasion resistance and repulsion of a golf ball can be improved.

9 Claims, 7 Drawing Sheets

OTHER PUBLICATIONS

Showa Highpolymer BIONOLLE Product Data Sheet—Biodegradable Plastic, Showa Highpolymer Co., Ltd., Copyright 2009.
Ahn et al., "Synthesis and Characterization of the Biodegradable Copolymers from Succinic Acid and Adipic Acid with 1,4-Butanediol", Journal of Applied Polymer Science, vol. 82, 2001, pp. 2808-2826.
Non-Final Office Action dated Dec. 23, 2010 for copending U.S. Appl. No. 12/005,378.
Office Action in Japanese Application No. 2007-340984 mailed Mar. 1, 2011, including an English translation.
English translation of Office Action in Japanese Application No. 2007-262650, dated Mar. 21, 2012.
Japanse Office Action dated May 29, 2012, for Application No. 2007-340984 with the English translation.
Japanese Office Action, dated Jun. 5, 2012, for Japanese Application No. 2008-246687, including an English translation.
US Notice of Allowance, dated Aug. 15, 2011, for U.S. Appl. No. 12/005,378.
US Office Action, dated Aug. 8, 2011, for U.S. Appl. No. 12/005,378.
US Office Action, dated Jul. 13, 2010, for U.S. Appl. No. 12/005,378.
US Office Action, dated Oct. 20, 2010, for U.S. Appl. No. 12/005,378.

* cited by examiner

Golf Ball No. 16

Golf Ball No. 16
(Expanded Drawing)

Golf Ball No. 24

Golf Ball No. 24
(Expanded Drawing)

GOLF BALL

BACKGROUND OF THE INVENTION

1. Field of the Invention

The present invention relates to a golf ball, more particularly to an improvement in durability, abrasion resistance and repulsion of a golf ball.

2. Description of the Related Art

In recent years, from a viewpoint of environmental preservation or enabling golfers to practice without recovering a large number of lost balls, use of biodegradable resins has been investigated for a high molecular weight material constituting a golf ball. For example, Japanese Patent Publication No. 2006-247224 A discloses a one-piece golf ball or a golf ball including a core and a mono- or multi-layer cover covering the core, wherein any one of the constituent components is made of a biodegradable material in order to provide a golf ball with a reduced load on the natural environment.

US Patent No. 2004/0209701 A discloses a golf ball that would allow a golfer to repeatedly practice the golfer's swing in a small area without having to collect a large number of balls after the practice is complete. The golf ball comprises a substantially spherical and substantially biodegradable outer shell having an interior cavity, and a substantially biodegradable force-absorbing member disposed within the interior cavity. This force-absorbing member is operational to affect the performance characteristics of the golf ball so that the maximum range of the golf ball is less than 75 yards.

SUMMARY OF THE INVENTION

As described above, although biodegradable materials as a material for golf balls have been investigated, a golf ball having a cover using a biodegradable material alone as a resin component is very hard and brittle. As a result, the durability, abrasion resistance and repulsion of the golf ball are deteriorated.

The inventors of the present invention have made a patent application of an invention of a golf ball including a core and a cover covering the core, wherein at least either the core or the cover contains, as a resin component, a polyester resin having a non-petroleum based material as a constituent component. However, a golf ball having a cover using, as a resin component, only the polyester resin containing the non-petroleum based material as a constituent component also tends to be poor in abrasion resistance as well as to be hard and brittle.

In view of the above circumstances, an object of the present invention is to provide a golf ball excellent in durability and abrasion resistance while using a non-petroleum based material. Another object of the present invention is to provide a golf ball excellent in durability and repulsion property while using a non-petroleum based material.

The present invention which has solved the above-mentioned problems provides a golf ball comprising a core and a cover covering the core, wherein the cover is formed from a cover composition containing a non-petroleum based polyester resin as a resin component (A) and a needle-like and/or fibrous filler (B), wherein the non-petroleum based polyester resin contains a dicarboxylic acid (a-1) and a diol and/or a hydroxycarboxylic acid (a-2) as a constituent component, and at least one of the dicarboxylic acid (a-1) and the diol and/or the hydroxycarboxylic acid (a-2) is a non-petroleum based material. Addition of the resin component containing the non-petroleum based polyester resin and the needle-like and/or fibrous filler to the cover composition makes it possible to improve the durability and abrasion resistance of the golf ball as a whole.

The average length of the needle-like and/or fibrous filler (B) is preferably from 1 μm to 2000 μm and the average aspect ratio thereof is preferably from 10 to 100. Further, the content of the needle-like and/or fibrous filler (B) in the cover composition is preferably from 1 part to 20 parts with respect to 100 parts of the resin component (A) by mass.

With respect to the needle-like and/or fibrous filler (B), the fibrous filler is preferably, for example, a kenaf fiber and the needle-like filler is preferably, for example, a potassium titanate whisker, a graphite whisker, an alumina whisker, a silicon carbide whisker, a silicon nitride whisker, a mullite whisker, a magnesia whisker, a magnesium borate whisker, a zinc oxide whisker, or a titanium boride whisker.

The present invention further provides a golf ball comprising a core and a cover covering the core, wherein the cover is formed from a cover composition containing, a non-petroleum based polyester resin (A-1), at least one petroleum based thermoplastic resin (A-2) selected from a binary copolymer composed of ethylene and an α,β-unsaturated carboxylic acid, a ternary copolymer of ethylene, an α,β-unsaturated carboxylic acid, and an α,β-unsaturated carboxylic acid ester, and their metal salt, as a resin component (A), and a compatibilizer (C) containing at least a (meth)acrylic resin (C-1) having a polar functional group and an olefin resin (C-2) having a polar functional group, wherein the non-petroleum based polyester resin contains a dicarboxylic acid, a diol and/or a hydroxycarboxylic acid as a constituent component, and at least one of the dicarboxylic acid, the diol and/or the hydroxycarboxylic acid is a non-petroleum based material.

Addition of, as a resin component (A), the polyester resin (A-1) containing a non-petroleum based material as a constituent component and the petroleum based thermoplastic resin (A-2) and, as a compatibilizer (C), a (meth)acrylic type resin (C-1) having a polar functional group and an olefin type resin (C-2) having a polar functional group into the cover composition makes it possible to improve the repulsion property of a golf ball as compared with that of the case of using a non-petroleum based polyester resin alone and further improve the durability of a golf ball by enhancing the compatibility of the non-petroleum based polyester resin with the petroleum based thermoplastic resin and the interface strength thereof.

The polar functional group of the (meth)acrylic type resin (C-1) of the compatibilizer (C) is preferably a glycidyl group, a hydroxyl group, a carboxyl group, an amino group, an imino group, a sulfone group, a nitro group, or an aldehyde group. Further, the polar functional group of the olefin type resin (C-2) of the compatibilizer (C) is preferably a glycidyl group, a hydroxyl group, a carboxyl group, an amino group, an imino group, a sulfone group, a nitro group, or an aldehyde group.

The (meth)acrylic type resin (C-1) of the compatibilizer (C) is preferably a methyl methacrylate-glycidyl methacrylate copolymer and the olefin type resin (C-2) of the compatibilizer (C) is preferably an ethylene-glycidyl methacrylate copolymer.

The ratio of the (meth)acrylic type resin (C-1) to the olefin type resin (C-2) ((meth)acrylic type resin (C-1)/olefin type resin (C-2)) contained in the compatibilizer (C) is preferably from 0.1 to 8.

The content ratio ((A-1)/(A-2), 100 parts by mass in total) of the non-petroleum based polyester resin (A-1) to the petroleum based thermoplastic resin (A-2) contained in the resin component (A) is preferably 50 to 95 parts/5 to 50 parts by mass, and the content of the compatibilizer (C) in the cover composition is preferably from 1 to 30 parts with respect to 100 parts by mass of the resin component (A).

According to one aspect of the present invention, a golf ball excellent in durability and abrasion-resistance while using a non-petroleum based material and can be obtained.

Further, according to another aspect of the present invention, a golf ball excellent in the durability and repulsion property while using a non-petroleum based material can be obtained.

DESCRIPTION OF THE PREFERRED EMBODIMENTS

Figure 1:
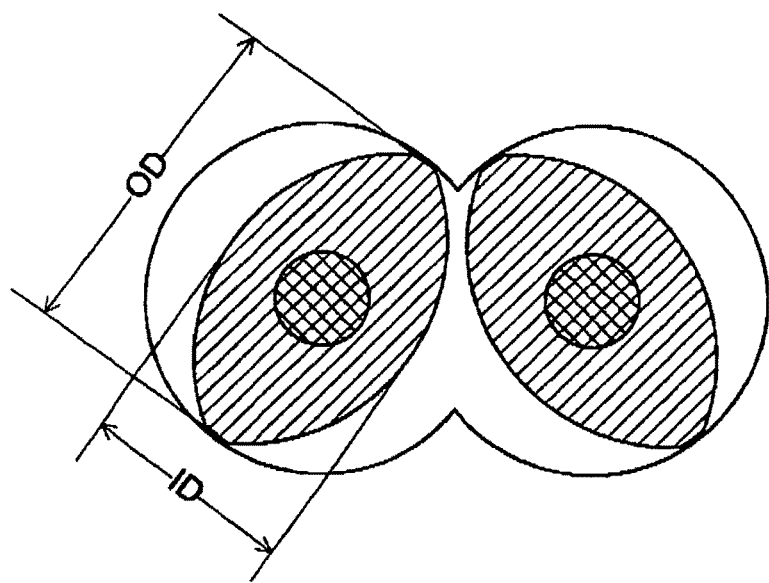
FIG. 1 is a schematic cross-sectional view of a twin screw extruder.

The present invention provides a golf ball comprising a core and a cover covering the core, wherein the cover is formed from a cover composition containing a non-petroleum based polyester resin as a resin component (A) and a needle-like and/or fibrous filler (B), and wherein the non-petroleum based polyester resin contains a dicarboxylic acid (a-1) and a diol and/or a hydroxycarboxylic acid (a-2) as a constituent component, and at least one of the dicarboxylic acid (a-1) and the diol and/or the hydroxycarboxylic acid (a-2) is a non-petroleum based material.

The present invention further provides a golf ball comprising a core and a cover covering the core, wherein the cover is formed from a cover composition containing, a non-petroleum based polyester resin (A-1), at least one petroleum based thermoplastic resin (A-2) selected from a binary copolymer composed of ethylene and an α,β-unsaturated carboxylic acid, a ternary copolymer of ethylene, an α,β-unsaturated carboxylic acid, and an α,β-unsaturated carboxylic acid ester, and their metal salt, as a resin component (A), and a compatibilizer (C) containing at least a (meth)acrylic resin (C-1) having a polar functional group and an olefin resin (C-2) having a polar functional group, wherein the non-petroleum based polyester resin contains a dicarboxylic acid, a diol and/or a hydroxycarboxylic acid as a constituent component, and at least one of the dicarboxylic acid, the diol and/or the hydroxycarboxylic acid is a non-petroleum based material.

First, the polyester resin, containing a non-petroleum based material as a constituent component, to be used as a resin component (A) for the cover composition (hereinafter, sometimes referred to simply as a "non-petroleum based polyester resin") will be described.

The non-petroleum based polyester resin is a polyester resin having a dicarboxylic acid (a-1), a diol and/or a hydroxycarboxylic acid (a-2) as a constituent component, wherein at least one of the dicarboxylic acid (a-1) and the diol and/or the hydroxycarboxylic acid (a-2) is a non-petroleum based material. Such examples include a copolymer polyester resin comprising the dicarboxylic acid and the diol as the constituent component wherein at least one of the dicarboxylic acid and the diol is the non-petroleum based material; a copolymer polyester resin comprising the dicarboxylic acid, the diol and the hydroxycarboxylic acid as constituent components, wherein at least one of the dicarboxylic acid, the diol, and the hydroxycarboxylic acid is a non-petroleum based material; and a copolymer polyester resin comprising a polyhydroxycarboxylic acid block, the dicarboxylic acid and the diol as constituent components, wherein at least one of the dicarboxylic acid, the diol, and the hydroxycarboxylic acid is a non-petroleum based material. The non-petroleum based polyester resin can be produced by a method which is known to the public.

Here, the non-petroleum based material is not a material obtained by subjecting petroleum to purification, catalytic reforming and catalytic cracking, but is a material derived from a plant such as a corn a potato, a beet, and a sugarcane. For example, it can be obtained by processing the corn, potato, beet, sugarcane and the like into a starch or a sugar (such as cellulose) and then fermenting the resultant starch or sugar using a microorganism. Additionally, the non-petroleum based material can be produced by a publicly known method of fermentation and/or chemical conversion method using a vegetable oil and an animal oil.

Such a plant-derived non-petroleum based material can absorb and fix carbon dioxide in the atmosphere. Further, since carbon dioxide emitted at the time of incinerating the plant-derived non-petroleum based material was originally present in the atmosphere, unlike the case of incinerating a petroleum type material, the plant-derived non-petroleum based material does not increase the carbon dioxide amount in the atmosphere. Accordingly, increase in the carbon dioxide amount in the atmosphere can be suppressed by using the non-petroleum based polyester resin as the resin component for the cover composition and such use results in contribution to prevention of global warming.

The dicarboxylic acid (a-1) is not particularly limited as long as it is an organic compound having two carboxyl groups in a molecule, and such examples of the dicarboxylic acid include succinic acid, adipic acid, azelaic acid, sebacic acid, dodecane dicarboxylic acid, anhydrous maleic acid, fumaric acid, 1,3-cyclopentane dicarboxylic acid, terephthalic acid, isophthalic acid, 1,4-naphthalene dicarboxylic acid, 2,5-naphthalene dicarboxylic acid, 2,6naphthalene dicarboxylic acid, 1,8-naphthalene dicarboxylic acid and biphenyl dicarboxylic acid. These can be used alone or as a mixture of two or more kinds. Among them, succinic acid, adipic acid, fumaric acid, maleic acid, pyruvic acid and the like may be preferably used as the non-petroleum based material.

The diol (a-2) is not particularly limited as long as it is an organic compound having two hydroxyl groups in a molecule. Such examples include a diol such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexane diol, and bisphenol A. These can be used alone or as a mixture of two or more kinds. Among them, 1,4-butanediol, 1,3-propanediol, and ethylene glycol are preferably used as non-petroleum based materials.

The hydroxycarboxylic acid (a-2) is not particularly limited as long as it is an organic compound having one hydroxyl group and one carboxyl group in a molecule, respectively. Such examples include lactic acid, hydroxy acetic acid (glycolic acid), hydracrylic acid, hydroxybutyric acid, hydroxyvaleric acid, hydroxycyclohexane carboxylic acid, salicylic acid, hydroxybenzoic acid, and hydroxy toluic acid. These can be used alone or as a mixture of two or more kinds.

Among them, particularly preferred examples are polybutylene succinate using butanediol as the diol component and succinic acid as the dicarboxylic acid component; and polybutylene succinate adipate using butanediol as the diol component and succinic acid and adipic acid as the dicarboxylic acid components. Herein, a blending ratio of succinic acid/ adipic acid is preferably ranging from 60/40 to 95/5, more preferably 70/30 to 90/10, even more preferably 75/25 to 85/15 by mass %. In general, a polymeric material having high rigidity is also high in hardness. Thus, if the polymeric material having high rigidity is used as a resin component constituting a cover, a resultant cover becomes fragile, resulting in lowering of durability. However, the polybutylene succinate and the polybutylene succinate adipate are low in hardness for their high rigidity, so that durability can be enhanced when it is used as the resin component constituting the cover. The non-petroleum based polyester resin can be synthesized by a publicly known method for synthesizing a polyester resin.

As the polybutylene succinate or the polybutylene succinate adipate, for example, one having a weight average molecular weight of 50,000 or more and 200,000 or less (preferably 70,000 to 80,000) and a glass transition temperature of −40° C. or more and −10° C. or less (preferably from −30° C. to −20° C.), MFR (190° C., load of 2.16 kg) of 2 g/10 min to 30 g/10 min (preferably 5 g/10 min to 20 g/10 min) may be preferably used.

Slab hardness of the non-petroleum based polyester resin is preferably 70 or less, more preferably 68 or less, even more preferably 65 or less in shore D hardness. If the slab hardness of the non-petroleum based polyester resin is more than 70 in shore D hardness, the resultant cover may become too hard, resulting in lowering the durability. A lower limit of the slab hardness of the non-petroleum based polyester resin is not particularly limited, but it is preferably 30 or more, more preferably 35 or more, even more preferably 40 or more in shore D hardness. If the slab hardness of the non-petroleum based polyester resin is less than 30, tackiness is increased, resulting in lowering of resilience. The slab hardness of the non-petroleum based polyester resin can be made to fall in the above range by suitably selecting, for example, the kind of the copolymerization component, the content thereof, and the molecular weight of the polyester resin. For example, a copolymer polyester resin of polylactate, butanediol and succinic acid is excellent in durability due to its lower hardness compared with a case where polylactate and polybutylene succinate are mixed.

In the case that the cover is formed from a cover composition containing a non-petroleum based polyester resin as a resin component (A) and a needle-like and/or fibrous filler (B), the cover preferably contains, as a resin component (A), a mixture of the non-petroleum based polyester resin and another petroleum-based thermoplastic resin. By using the mixture of the non-petroleum based polyester and another petroleum-based thermoplastic resin as the resin component of the cover, abrasion-resistance as well as durability of the cover can be improved. Herein, the petroleum-based thermoplastic resin means a thermoplastic resin produced from a raw material obtained by subjecting petroleum to purification, catalytic reforming, catalytic cracking or the like, without having a non-petroleum based material as a constitutional component.

Examples of the petroleum-based thermoplastic resin include an ionomer resin, a polyurethane resin, a polystyrene resin, a polyamide resin, a polyester resin and the like. Examples of the ionomer resin include one obtained by neutralizing at least a part of carboxyl groups in a copolymer consisting of ethylene and α,β-unsaturated carboxylic acid having 3 to 8 carbon atoms with a metal ion, or one obtained by neutralizing at least a part of carboxyl groups in a ternary copolymer consisting of ethylene, α,β-unsaturated carboxylic acid having 3 to 8 carbon atoms and α,β-unsaturated carboxylic acid ester with a metal ion, or a mixture thereof.

Specific examples of the ionomer resins include, but not limited to, Himilan 1555(Na), Himilan 1557(Zn), Himilan 1605(Na), Himilan 1706(Zn), Himilan 1707(Na), Himilan AM7311 (Mg), and examples of the ternary copolymer ionomer resin include Himilan 1856(Na) and Himilan. 1855(Zn) available from MITSUI-DUPONT POLYCHEMICAL CO., LTD.

Further, ionomer resins available from DUPONT CO. include Surlyn 8945(Na), Surlyn 9945(Zn), Surlyn 8140(Na), Surlyn 8150(Na), Surlyn 9120(Zn), Surlyn 9150 (Zn), Surlyn 6910(Mg), Surlyn 6120(Mg), Surlyn 7930(Li), Surlyn 7940(Li), Surlyn AD8546(Li), and examples of the ternary copolymer ionomer resin include Surlyn 8120(Na), Surlyn 8320(Na), Surlyn 9320(Zn), and Surlyn 6320(Mg).

Ionomer resins such as Iotek 8000(Na), Iotek 8030(Na), Iotek 7010(Zn), and Iotek 7030(Zn) are available from Exxon Co. Examples of the ternary copolymer ionomer resin include Iotek 7510(Zn) and Iotek 7520(Zn). The ionomer resins exemplified above can be used alone, or as a mixture of two or more. Na, Zn, K, Li, or Mg described in the parentheses after the commercial name of the ionomer resin represents a kind of metal used for neutralization.

Specific examples of other petroleum-based thermoplastic resins include, for example, a thermoplastic polyamide resin having a commercial name of PEBAX such as "PEBAX 2533" available from ARKEMA Inc, a thermoplastic polyester resin having a commercial name of "HYTREL" such as "HYTREL 3548" and "HYTREL 4047" available from DU PONT-TORAY Co, a thermoplastic polystyrene resin having a commercial name of "RABALON" available from Mitsubishi Chemical Corporation, a thermoplastic polyurethane resin having a commercial name of "ELASTOLLAN" such as "ELASTOLLAN ET880" available from BASF POLUURETHANE ELASTOMERS and the like. Among them, a preferred embodiment is that the cover contains, as a resin component, a mixture of the non-petroleum based polyester resin and at least one kind of petroleum-based thermoplastic resin selected from the group consisting of an ionomer resin, a polyurethane resin, a polystyrene resin, a polyester resin, and a polyamide resin. A more preferable embodiment is that the cover contains a mixture of the non-petroleum based polyester resin and the ionomer resin.

A content of the non-petroleum based polyester resin in the mixture is preferably 30 mass % or more, more preferably 40 mass % or more, even more preferably 45 mass % or more. If the content of the non-petroleum polyester resin is 30 mass % or more, an improvement effect on durability becomes conspicuous. On the other hand, an upper limit of the content of the non-petroleum based polyester resin in the mixture is not particularly limited, but it is preferably 100 mass %, more preferably 95 mass %, even more preferably 90 mass %.

In a preferred embodiment of the present invention, the cover further contains a compatibilizer of the non-petroleum based polyester resin and at least one kind of petroleum-based thermoplastic resin selected from the group consisting of an ionomer resin, a polyurethane resin, a polystyrene resin, a polyester resin, and a polyamide resin. If the non-petroleum based polyester resin and the petroleum-based thermoplastic resin are simply mixed, a phase separation may occur depending on the kind of the petroleum-based thermoplastic resin, resulting in lowering of appearance of the resultant golf ball.

The compatibilizer is not limited as long as it enhances the compatibility of the non-petroleum based polyester resin and other petroleum-based thermoplastic resins, and can be suitably selected in accordance with the kind of the petroleum-based thermoplastic resin. Such examples include one obtained by modifying a thermoplastic elastomer such as a polyolefin elastomer, a polyester elastomer, a polyurethane elastomer, a polyamide elastomer, and a polystyrene elastomer with a polar functional group.

Examples of the polar functional group may include a carboxyl group, an epoxy group represented by a glycidyl group, a hydroxyl group, a sulfonate group and the like. By using an elastomer modified with the polar functional group, compatibility of the non-petroleum based polyester resin with other petroleum-based thermoplastic resins can be enhanced.

Specific examples of the compatibilizer include maleic acid-modified SEBS (styrene-ethylene-butylene-styreneblock polymer), maleic acid-modified SEBC styrene-ethylene-butylene-olefin crystalline block polymer), maleic acid-modified PE (polyethylene), methyl methacrylate-glycidyl methacrylate copolymer, ethylene-glycidyl methacrylate copolymer, ethylene-methyl methacrylate-glycidyl methacrylate copolymer, maleic acid-modified PP (polypropylene), maleic acid-modified EVA (ethylene-vinyl acetate copolymer), and maleic acid-modified EPDM (ethylene-propylene-diene terpolymer).

The amount of the compatibilizer contained in the cover composition is preferably 1 part or more, more preferably 2 parts or more, even more preferably 3 parts or more, and is preferably 25 parts or less, more preferably 20 parts or less, even more preferably 15 parts or less with respect to 100 parts of the resin component A by mass. If the amount of the compatibilizer is within the above range, the compatibility of the non-petroleum based polyester resin and the other petroleum-based thermoplastic resin can be improved.

Next, the needle-like or fibrous filler (B) to be used in a preferable embodiment of the present invention will be described. The needle-like and/or fibrous filler has no particular limitation on the material, as long as the filler has a needle-like or fibrous shape. Commonly commercialized needle-like fillers and fibrous fillers may be used.

Examples of the needle-like filler are inorganic whiskers such as a potassium titanate whisker, a graphite whisker, an alumina whisker, a silicon carbide whisker, a silicon nitride whisker, a mullite whisker, a magnesia whisker, a magnesium borate whisker, a zinc oxide whisker, and a titanium boride whisker; and a three-dimensional metal oxide having a three-dimensional shape wherein a plurality of needle-like fillers are jointed to each other at the one ends thereof and the other ends thereof extend in the different directions (as a specific example, "Panatetra (registered trademark)", manufactured by Matsushita Electric Industrial Co., Ltd. can be mentioned). These needle-like fillers may be used alone or two or more of them may be used in combination.

Examples of the fibrous filler are natural fibers of kenaf, cotton, flax plant, sheep wool, silk, feather, or asbestos; synthetic fibers such as a nylon fiber, a vinylon fiber, an acrylic fiber, a polyester fiber, a polyolefin fiber, and a polyurethane fiber; inorganic fibers such as a glass fiber, a carbon fiber, an alumina fiber, a potassium titanate fiber, a basic magnesium sulfate fiber, and a calcium carbonate fiber; natural mineral fibers such as wallastonite ($CaO\text{—}SiO_2$) and fibrous brucite ($Mg(OH)_2$); and a metal fiber. These fibrous fillers may be used alone or in combination of at least two of them. Further, the needle-like fillers and the fibrous fillers may be used in combination.

The average length of the needle-like and fibrous filler is preferably 1 μm or longer, more preferably 2 μm or longer, and even more preferably 5 μm or longer. The average length of the filler is preferably 2,000 μm or shorter and more preferably 1500 μm or shorter. If the average length of the needle-like and fibrous filler is shorter than 1 μm, the anchor effect between the cover and the core is lowered and thus the durability of the golf ball may not be improved and if the average length exceeds 2,000 μm, the appearance of the golf ball may possibly become poor.

Further, the average aspect ratio of the needle-like and fibrous filler is preferably 10 or higher and more preferably 15 or higher. The average aspect ratio is preferably 100 or lower and more preferably 50 or lower. If the average aspect ratio of the needle-like and fibrous filler is less than 10, the anchor effect between the cover and the core is lowered and thus the durability of the golf ball may not be improved and if the average aspect ratio exceeds 100, the appearance of the golf ball may possibly become poor.

The average length of the filler in the present invention means an average value of the length in the longitudinal direction of the needle-like and/or fibrous filler and the average aspect ratio means the ratio of the average length to the average diameter of the needle-like and/or fibrous filler (average length/average diameter). However, with respect to the three-dimensional metal oxides, the whiskers constituting the three-dimensional metal oxide are regarded as respective needle-like fillers to calculate the average length and the average aspect ratio.

In the present invention, the content of the needle-like and/or fibrous filler (B) contained in the cover composition is preferably not less than 1 part by mass, more preferably not less than 3 parts by mass, and furthermore preferably not less than 5 parts by mass, and preferably not more than 20 parts by mass, more preferably not more than 18 parts by mass, and more preferably not more than 15 parts by mass with respect to 100 parts by mass of the resin component (A). If the content of the needle-like and/or fibrous filler (B) is less than 1 part by mass, the durability of the cover to be obtained may possibly be poor. Further, if the content of the needle-like and/or fibrous filler (B) exceeds 20 parts by mass, the appearance of the golf ball may possibly become poor.

The cover composition of the golf ball of the present invention may further contain, besides the above-mentioned resin component (A), the needle-like and/or fibrous filler (B), and a compatibilizer, a pigment component such as a white pigment (titanium oxide) or a blue pigment; a specific gravity adjustment agent such as calcium carbonate and barium sulfate, a dispersant, an antioxidant, an ultraviolet absorbent, a light stabilizer, a fluorescent material or a fluorescent whitening agent to an extent that the cover performance is not deteriorated.

The content of the white pigment (titanium oxide) is preferably 0.5 part by mass or more, more preferably 1 part by mass or more, and preferably 10 parts by mass or less, more preferably 8 parts by mass or less based on 100 parts by mass of the resin component constituting the cover. The white pigment in an amount of 0.5 part by mass or more can impart opacity to the cover, while the white pigment in an amount of more than 10 parts by mass may lower the durability of the resulting cover.

In one preferable embodiment of the present invention, the cover of the golf ball is formed by molding a cover composition obtained by kneading the resin component (A), the needle-like and/or fibrous filler (B), the compatibilizer, and the various kinds of the additives. Kneading of the cover composition can be carried out by using a publicly known kneading method. For example, in the case of kneading by a biaxial extruder, it is preferable to adjust the screw groove depth difference ratio to be 1.6 or higher, the screw rotation speed to be 200 rpm or higher, and screw L/D to be 30 or higher With such a configuration, the needle-like and/or fibrous filler to be mixed may be dispersed in the resin component while maintaining the sizes of the needle-like and/or fibrous filler.

Figure 2:
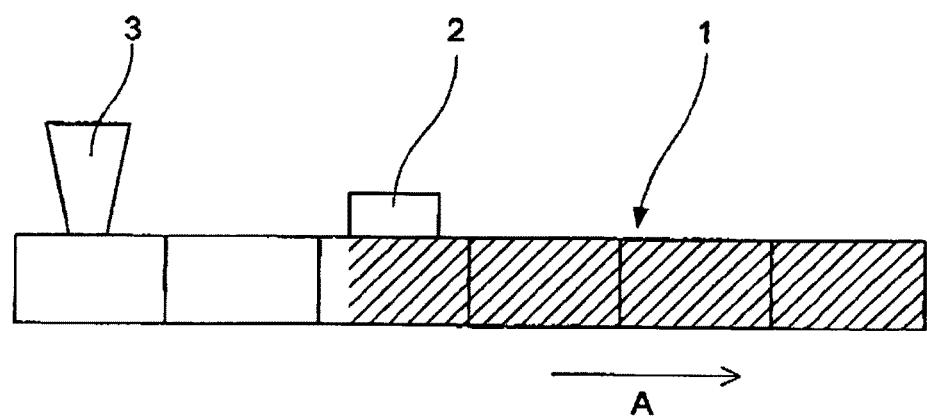
FIG. 2 is a schematic side view of a twin screw extruder.

Herein, the screw groove depth difference ratio is defined as a ratio (OD/ID) of the screw outer diameter (OD) and the screw inner diameter (ID) in the cross-sectional view shown in FIG. 1. As the value of the screw groove depth difference ratio is higher, the free volume of the screw becomes larger, and therefore the charged needle-like and/or fibrous filler (B) becomes hard to be broken and may be dispersed in the resin component (A) while keeping the average aspect ratio at the time of charging. Further, as shown in FIG. 2, in a biaxial extruder 1, the portion (the part marked by slashes) where the screw groove depth difference ratio is adjusted to be 1.6 or higher may be only a downstream region from a filler charging inlet 2 in the extrusion direction and the upstream side from the filler charging inlet 2 is not necessarily required to have the screw groove depth difference ratio of 1.6 or higher. In FIG. 2, an arrow A shows the extrusion direction, and 3 shows the resin charging inlet.

In another preferable embodiment of the present invention, the cover is formed from a cover composition containing, a non-petroleum based polyester resin (A-1), at least one petroleum based thermoplastic resin (A-2) selected from a binary copolymer composed of ethylene and an α,β-unsaturated carboxylic acid, a ternary copolymer of ethylene, an α,β-unsaturated carboxylic acid, and an α,β-unsaturated carboxylic acid ester, and their metal salt, as a resin component (A), and a compatibilizer (C) containing at least a (meth)acrylic resin (C-1) having a polar functional group and an olefin resin (C-2) having a polar functional group, wherein the non-petroleum based polyester resin contains a dicarboxylic acid, a diol and/or a hydroxycarboxylic acid as a constituent component, and at least one of the dicarboxylic acid, the diol and/or the hydroxycarboxylic acid is a non-petroleum based material.

Next, at least one petroleum based thermoplastic resin (A-2) selected from binary copolymers of ethylene and an α,β-unsaturated carboxylic acid, ternary copolymers of ethylene, an α,β-unsaturated carboxylic acid, and an α,β-unsaturated carboxylic acid ester, and their metal salts to be used as the resin component (A) will be described.

The α,β-unsaturated carboxylic acid to be used for the binary copolymers of ethylene and the α,β-unsaturated carboxylic acid is a compound that has at least one carboxyl group in a molecule and in which at least carbon atoms located at α and β positions form an ethylenically unsaturated double bond. The α,β-unsaturated carboxylic acid preferably has 3 to 18 carbon atoms and more preferably 3 to 8 carbon atoms. Examples of the α,β-unsaturated carboxylic acid having 3 to 18 carbon atoms are acrylic acid, methacrylic acid, fumaric acid, maleic acid, crotonic acid (trans-2-butenoic acid), isocrotonic acid (cis-2-butenoic acid), sorbic acid, citraconic acid, mesaconic acid, and the like.

Further, examples of the α,β-unsaturated carboxylic acid ester to be used for the ternary copolymers of ethylene, the α,β-unsaturated carboxylic acid, and the α,β-unsaturated carboxylic acid ester are methyl, ethyl, propyl, n-butyl, or isobutyl esters of acrylic acid, methacrylic acid, fumaric acid, maleic acid, crotonic acid (trans-2-butenoic acid), isocrotonic acid (cis-2-butenoic acid), sorbic acid, citraconic acid, mesaconic-acid, and the like.

Preferable examples of the binary copolymers to be used are binary copolymers obtained by copolymerization of ethylene and (meth)acrylic acid and preferable examples of the ternary copolymers are ternary copolymers obtained by copolymerization of ethylene, (meth)acrylic acid, and (meth)acrylic acid esters.

Trade names of specific examples of the binary copolymers obtained by copolymerization of ethylene and (meth)acrylic acid are "NUCREL (registered trademark), e.g. NUCREL AN4214C, NUCREL AN4225C, NUCREL AN42115C, NUCREL N0903HC, NUCREL N0908C, NUCREL AN42012C, NUCREL N410, NUCREL N1035, NUCREL N1050H, NUCREL N1108C, NUCREL N1110H, NUCREL N1207C, NUCREL N1214, NUCREL AN4221C, NUCREL N1525, NUCREL N1560, NUCREL N0200H, NUCREL AN4228C, NUCREL N4213C, NUCREL N035C, or the like" commercially available from MITSUI-DUPONT POLYCHEMICAL CO., LTD. Trade names of specific examples of the ternary copolymers obtained by copolymerization of ethylene, (meth)acrylic acid, and a (meth)acrylic acid ester are NUCREL AN4311, NUCREL AN4318, and the like.

The metal salts of the binary copolymers of ethylene and the α,β-unsaturated carboxylic acid, or of the ternary copolymers of ethylene, an α,β-unsaturated carboxylic acid, and an α,β-unsaturated carboxylic acid ester are those obtained by neutralizing at least a part of carboxylic groups of the α,β-unsaturated carboxylic acid contained in the binary copolymers of ethylene and an α,β-unsaturated carboxylic acid, or at least a part of carboxylic groups of the α,β-unsaturated carboxylic acid contained in the ternary copolymers of ethylene, an α,β-unsaturated carboxylic acid, and an α,β-unsaturated carboxylic acid ester with metal ions and for example, ionomer resins can be exemplified.

The content of the acid component (unsaturated carboxylic acid component) in the ionomer resins is preferably not less than 5% by mass, more preferably not less than 8% by mass, and even more preferably not less than 10% by mass and preferably not more than 30% by mass, more preferably not more than 25% by mass, and even more preferably not more than 20% by mass. It is because if the content of the acid component (unsaturated carboxylic acid component) is less than 5% by mass, no desired hardness or stiffness can be obtained although the fluidity is good and if it exceeds 30% by mass, the fluidity is sometimes deteriorated although the hardness and stiffness are increased.

Examples of the metal (ion) for neutralizing at least some of carboxylic groups in the binary copolymers of ethylene and the α,β-unsaturated carboxylic acid or in the ternary copolymers of ethylene, the α,β-unsaturated carboxylic acid, and the α,β-unsaturated carboxylic acid ester are alkali metals (ions) such as sodium, potassium, and lithium; divalent metals (ions) such as magnesium, calcium, zinc, barium, and cadmium; trivalent metals (ions) such as aluminum; and other metals (ions) such as tin and zirconium and particularly, sodium, zinc, and magnesium (ions) can be used preferably in terms of the repulsion property and durability.

The neutralization degree of the carboxyl groups contained in the binary or ternary copolymers is preferably 5% by mole or higher, more preferably 10% by mole or higher, and even more preferably 20% by mole or higher and preferably 100% by mole or lower, more preferably 90% by mole or lower, and even more preferably 80% by mole or lower. The neutralization degree of the carboxyl groups can be defined by the following formula:

> Neutralization degree=100×[number of moles of neutralized carboxyl groups in ionomer resin/total number of moles of carboxyl groups in ionomer resin].

The neutralization can be carried out by melting an ethylenic binary copolymer or ternary copolymer by high pressure radical copolymerization, adding a prescribed amount of an inorganic metal compound to the melted copolymer, and kneading an obtained mixture. Specifically, the copolymer is melted and kneaded with the inorganic metal compound at the temperature of from 150° C. to 300° C. using an extrusion molding apparatus. Examples of the inorganic metal compound are a hydroxide, an oxide, a carbonated compound (carbonate), a hydrogencarbonate (bicarbonate), a phosphorylated compound (phosphate), a sulfated compound (sulfate), and an acetate. Among them, preferable examples are the hydroxide or the oxide.

Specific examples of the binary copolymer and the ternary copolymer include ionomer resins which are exemplified earlier.

The content ratio (the non-petroleum based polyester resin (A-1)/the petroleum based thermoplastic resin (A-2), 100 parts by mass in total) of the non-petroleum based polyester resin (A-1) to the petroleum based thermoplastic resin (A-2) in the resin component (A) preferably has 50 to 95 parts by mass/5 to 50 parts by mass, and more preferably 50 to 60 parts by mass/40 to 50 parts by mass. In the case the content ratio of the non-petroleum based polyester resin (A-1) to the petroleum type thermoplastic resin (A-2) is out of the above-mentioned range, the moldability of the cover composition may be deteriorated, or since the bending rigidity of the cover composition is lowered, the flight distance of the golf ball may be lowered due to the increased spin rate when hitting the golf ball with the driver.

The resin component (A) may further contain other petroleum-based thermoplastic resins in addition to the above mentioned non-petroleum-based thermoplastic resin (A-1) and the petroleum-based thermoplastic resin (A-2). Specific examples of other petroleum-based thermoplastic resins include, for example, a thermoplastic polyamide resin having a commercial name of PEBAX such as "PEBAX 2533" available from ARKEMA Inc, a thermoplastic polyester resin having a commercial name of "HYTREL such as "HYTREL 3548" and "HYTREL 4047" available from DU PONT-TORAY Co, a thermoplastic polystyrene resin having a commercial name of "RABALON" available from Mitsubishi Chemical Corporation, a thermoplastic polyurethane resin having a commercial name of "ELASTOLLAN" such as "ELASTOLLAN ET880" available from BASF POLUURE-THANE ELASTOMERS and the like.

The total content of the non-petroleum based polyester resin (A-1) and the petroleum based thermoplastic resin (A-2) in the resin component (A) preferably not less than 80% by mass, more preferably not less than 85% by mass, and even more preferably not less than 90% by mass. The effect of improving the durability becomes significant by controlling the total content of the non-petroleum based polyester resin (A-1) and the petroleum based thermoplastic resin (A-2) to be not less than 80% by mass. In a preferable embodiment, the resin component (A) essentially consists of the non-petroleum based polyester resin (A-1) and the petroleum based thermoplastic resin (A-2).

Next, the compatibilizer (C) containing at least a (meth) acrylic type resin (C-1) having a polar functional group and an olefin type resin (C-2) having a polar functional group will be explained. The compatibilizer (C) is used to improve the compatibility of the non-petroleum based polyester resin (A-1) and the petroleum based thermoplastic resin (A-2). Just mixing the non-petroleum based polyester resin and the petroleum based thermoplastic resin may cause phase separation, depending on the type of the petroleum based thermoplastic resin, and therefore the appearance of the golf ball to be obtained may sometimes become poor.

In one preferable embodiment of the present invention, as the compatibilizer (C), the (meth)acrylic type resin (C-1) having a polar functional group and the olefin type resin (C-2) having a polar functional group are used at least. Since the (meth)acrylic type resin (C-1) having a polar functional group is high in polarity of the (meth)acrylic skeleton, it has good compatibility with the non-petroleum based polyester resin (A-1) but is inferior in compatibility with the petroleum type thermoplastic resin (A-2). On the other hand, since the olefin type resin (C-2) having a polar functional group is low in polarity of the olefin skeleton, it has good compatibility with the petroleum based thermoplastic resin (A-2) but is inferior in compatibility with the non-petroleum based polyester resin (A-1). Therefore, even if these (meth)acrylic type resin (C-1) having a polar functional group and the olefin type resin (C-2) having a polar functional group are used respectively alone, the compatibility of the non-petroleum based polyester resin (A-1) with the petroleum type thermoplastic resin (A-2) cannot be improved sufficiently. However, if these (meth)acrylic type resin (C-1) having a polar functional group and the olefin type resin (C-2) having a polar functional group are used in combination, the compatibility with the non-petroleum based polyester resin (A-1) and the petroleum type thermoplastic resin (A-2) can be improved further. Accordingly, mutual dispersibility of the non-petroleum based polyester resin (A-1) and the petroleum type thermoplastic resin (A-2) in the cover composition is further improved and the interface strength of the non-petroleum based polyester resin (A-1) and the petroleum type thermoplastic resin (A-2) is therefore further enhanced to improve the durability of the golf ball.

In one preferable embodiment of the present invention, the (meth)acrylic type resin (C-1) having a polar functional group is a polymer containing (meth)acrylic acid and/or its derivatives as a constituent component and having a polar functional group introduced thereinto. Herein, the polar functional group is a functional group having polarity and imparting the resin with the polarity. Examples thereof include an epoxy group, a hydroxyl group, an amino group, a nitro group, a carboxyl group, a formyl group, a nitryl group, and a sulfonic acid group.

As an embodiment of introducing the polar functional group into the (meth)acrylic polymer, there are, for example, an embodiment where a polar functional group-containing (meth)acrylic type monomer alone is polymerized; an embodiment where a polar functional group-containing (meth)acrylic type monomer is copolymerized with a (meth) acrylic type monomer having no polar functional group and/ or a monomer other than (meth)acrylic type monomer; and an embodiment where a (meth)acrylic type monomer having no polar functional group is copolymerized with a polar functional group-containing monomer other than (meth)acrylic type monomer. In the present invention, the embodiment where a polar functional group-containing (meth)acrylic type monomer is copolymerized with a (meth)acrylic type monomer having no polar functional group and/or a monomer other than a (meth)acrylic type monomer is preferable. In a more preferable embodiment, a (meth)acrylic acid ester into which a polar functional group is introduced is used as the polar functional group-containing (meth)acrylic type monomer.

Examples of the (meth)acrylic type monomer having no polar functional group include an alkyl(meth)acrylate such as methyl(meth)acrylate, ethyl(meth)acrylate, propyl(meth) acrylate, n-butyl(meth)acrylate, and isobutyl(meth)acrylate. Methyl(meth)acrylate is particularly preferable among them.

The polar functional group of the polar functional group-containing (meth)acrylic type monomer is preferably an epoxy group represented by a glycidyl group; a carboxyl group, a hydroxyl group, a sulfone group, and the like and a glycidyl group is more preferable among them.

Examples of the polar functional group-containing (meth) acrylic type monomer include a glycidyl group-containing acrylic monomer such as glycidyl(meth)acrylate; a hydroxyl group-containing acrylic monomer such as 2-hydroxyethyl (meth)acrylate and 2-hydroxypropyl(meth)acrylate; and a carboxyl group-containing acrylic monomer such as (meth) acrylic acid. The glycidyl group-containing acrylic monomer such as glycidyl(meth)acrylate is preferable among them.

Examples of the polar functional group-containing (meth) acrylic type resin (C-1) include a methyl methacrylate-glycidyl methacrylate copolymer and an epoxy group-containing acrylic polymer. These polar functional group-containing (meth)acrylic type resin (C-1) may be used alone or in combination of two or more of them. Among them, the methyl methacrylate-glycidyl methacrylate copolymer is preferably used.

Further, in one embodiment of the present invention, the polar functional group-containing olefin type resin (C-2) means a copolymer of an olefin and a polar functional group-containing monomer, in which the content of the olefin in the copolymer is 50% by mass or higher.

Examples of the olefin include ethylene, propylene, 1-butene, isobutene, and 1-pentene. These may be used alone or in combination of two or more of them. Ethylene and propylene are preferably used among them.

The polar functional group of the polar functional group-containing monomers is preferably an epoxy group represented by a glycidyl group; a carboxyl groups a hydroxyl group, a sulfone group, and the like. Among them, the glycidyl group is more preferable.

Examples of the polar functional group-containing monomer include the polar functional group-containing (meth) acrylic monomer such as glycidyl (meth)acrylate as described above, as well as an epoxy group-containing monomer such as 2-vinyloxylane and (allyloxy) oxylane; a hydroxyl group-containing monomer such as vinyl alcohol, allyl alcohol, and 2-hydroxyethyl vinyl ether; a sulfonic acid group-containing monomer such as vinyl sulfonic acid; and a carboxyl group-containing monomer such as itaconic acid and maleic anhydride. These polar functional group-containing monomers may be used alone or in combination of at least two of them. Among them, the polar functional group-containing (meth)acrylic monomer is preferable, and the glycidyl group-containing acrylic monomer such as glycidyl(meth) acrylate is more preferable.

Examples of the polar functional group-containing olefin type resin (C-2) include an ethylene-glycidyl(meth)acrylate copolymer, a maleic acid-modified styrene-ethylene-butylene-styrene block polymer (SEBS), a maleic acid-modified styrene-ethylene butylene-olefin crystalline block polymer (SEBC), a maleic acid-modified polyethylene (PE), a maleic acid-modified polypropylene (PP), a maleic acid-modified ethylene-vinyl acetate copolymer (EVA), a maleic acid-modified ethylene-propylene-diene rubber (EPDM), and an epoxy group-containing styrene type polymer. Among them, the ethylene-glycidyl (meth)acrylate copolymer is preferable.

The polar functional group-containing olefin type resin (C-2) preferably has an olefin content of 50% by mass or higher and more preferably has an olefin content of 60% by mass or higher in the copolymer.

Examples of the compatibilizer (C) which can be used include those containing an olefin and (meth)acrylate together in a molecule such as ethylene-methyl methacrylate-glycidyl methacrylate copolymer. In the present invention, with respect to such a copolymer, those having an olefin content of 50% by mass or higher in the copolymer are regarded as the olefin type resin (C-2) and those having an olefin content of less than 50% by mass in the copolymer are regarded as the (meth)acrylic type resin (C-1).

The content of the compatibilizer (C) in the cover composition is preferably 1 part by mass or higher and more preferably 2 parts by mass or higher and preferably 30 parts by mass or lower and more preferably 10 parts by mass or lower with respect to 100 parts by mass of the resin component (A). If the content of the compatibilizer (C) is less than 1 part by mass, the compatibility of the non-petroleum based polyester resin (A-1) with the petroleum based thermoplastic resin (A-2) cannot be improved sufficiently and the durability of the obtained golf ball may be lowered. Further, if it exceeds 30 parts by mass, the fluidity of the cover composition is lowered to possibly result in the molding to be difficult or the cover to be softened.

The content ratio of the (meth)acrylic type resin (C-1) to the olefin type resin (C-2) (acrylic type resin (C-1)/olefin type resin (C-2)) in the compatibilizer (C) is preferably not less than 0.1, more preferably not less than 0.3, and even more preferably not less than 0.5, and preferably not more than 8, more preferably not more than 7, and even more preferably not more than 5. If the content ratio of the (meth)acrylic type resin (C-1) to the olefin type resin (C-2) is lower than 0.1, the mutual dispersibility of the non-petroleum based polyester resin (A-1) and the petroleum based thermoplastic resin (A-2) in the resin component (A) is deteriorated and the repulsion of the golf ball is possibly decreased. Further, if the content ratio exceeds 8, the interface strength of the non-petroleum based polyester resin (A-1) and the petroleum based thermoplastic resin (A-2) becomes weak and the durability of the golf ball may possibly be lowered.

The slab hardness of the cover for a golf ball of the present invention is preferably 40 or more, more preferably 45 or more, even more preferably 50 or more, and preferably 70 or less, more preferably 68 or less, even more preferably 65 or less in shore D hardness. If the slab hardness of the cover is 40 or more, the rigidity of the resultant cover can be enhanced, and the golf ball excellent in resilience(distance) can be obtained. On the other hand, if the slab hardness is 70 or less, the durability can be further enhanced. Herein, the slab hardness of the cover means a hardness obtained by measuring the hardness of the cover composition molded into the sheet shape. The details of the method to measure the slab hardness is described later.

In one preferable embodiment, the cover composition preferably has a bending rigidity of 200 MPa or more, more preferably 210 MPa or more, even more preferably 230 MPa or more, and preferably has a bending rigidity of 600 MPa or less, more preferably 550 MPa or less, even more preferably 500 MPa or less. If the cover composition has a bending rigidity of less than 200 MPa, the flight distance may be lowered due to the increased spin rate at the driver shot. On the other hand, if the bending rigidity is more than 600 MPa, the durability may be lowered due to the excessively hard cover.

In one preferable embodiment, the cover composition has a resilience of 55% or more, more preferably 56% or more, even more preferably 57% or more. If the cover composition has a resilience of less than 55%, the desired ball repulsion may not be obtained.

In one preferable embodiment, the cover composition has a melt flow rate (MFR, 190° C., load of 2.16 kg) of 1 g/10 min or more, more preferably 2 g/10 min or more, even more preferably 3 g/10 min or more, and preferably has a MFR (190° C., load of 2.16 kg) of 10 g/10 min or less, more preferably 9 g/10 min or less, even more preferably 8 g/10 min or less. If the melt flow rate does not fall within the above range, the molding of the cover may be difficult.

In one preferable embodiment of the present invention, the cover of the golf ball is formed by molding a cover composition obtained by kneading the resin component (A), the compatibilizer (C), and the various kinds of the additives. Kneading of the cover composition can be carried out by using a publicly known kneading method. For example, an intermeshing corotation twin screw extruder can be used under the condition of extruding temperature of 180° C. or higher, feeding amount of 3 kg/h or more, screw rotation speed of 200 rpm or higher, and L/D=30 or higher.

The cover for the golf ball of the present invention can be prepared by molding the cover composition containing the above-mentioned cover materials. Examples of a method for molding a cover include a method wherein the cover composition is subjected to compression molding into hollow-shell shape, and the core is covered with a plurality of shells (preferably a method wherein a cover composition is compression-molded into hollow-half shell shape and the core is covered with two half shells), and a method wherein the cover composition is subjected to direct injection molding onto the core. In a case of subjecting the cover composition to injection molding directly onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition is charged and then cooled to obtain a cover. For example, the cover composition heated to 200° C. to 250° C. is charged into a mold held under the pressure of 9 MPa to 15 MPa in 0.5 to 5 seconds. After cooling for 10 to 60 seconds, the mold is opened.

If necessary, the golf ball formed with the cover is preferably subjected to surface treatment such as deburring, cleaning, and sandblast. If desired, a paint film or a mark may be formed.

In the present invention, the golf ball preferably has a cover with a thickness of 3.0 mm or less, more preferably 2.8 mm or less, even more preferably 2.5 mm or less. If the thickness of the cover is 3.0 mm or less, resilience and shot feeling will be improved. A lower limit of the thickness of the cover is not particularly limited, but it is, for example, preferably 0.3 mm, more preferably 0.5 mm, even more preferably 1.0 mm. If it is less than 0.3 mm, it may be difficult to form the cover. Additionally, durability and wear-resistance of the cover may become lowered.

Figure 3:
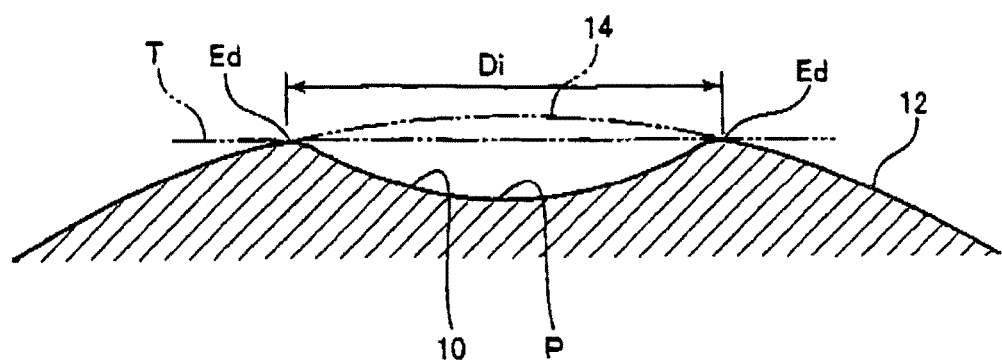
FIG. 3 is a expanded cross sectional view of a dimple formed on a golf ball surface.

When molding a cover, the concaves called "dimple" are usually formed on the surface. FIG. 3 is an expanded sectional view of a part of a golf ball 2. This figure shows a cross-section which includes the deepest part P of a dimple 10 and the center of the golf ball 2. The up and down direction in FIG. 3 is the depth direction of the dimple 10. The depth direction is the direction from the gravity center of the area of the dimple 10 to the center of the golf ball 2. A chain double-dashed line 14 in FIG. 3 shows a virtual sphere. The surface of the virtual sphere 14 is the surface of the golf ball 2 in the case of assuming that there is no dimple 10. The dimple 10 is depressed in the virtual sphere 14. A land 12 corresponds to the virtual sphere 14.

Two headed arrow Di in FIG. 3 shows the diameter of the dimple 10. The diameter Di is the distance from one contact point Ed to another contact point Ed when a common tangent line T is drawn in both sides of the dimple 10. The contact points Ed are edges of the dimple 10. The edges Ed define the outline of the dimple 10. The diameter Di is preferably 2.0 mm or more and 6.0 mm or less. If the diameter Di is less than 2.0 mm, the dimple effect is hardly obtained and if the diameter Di exceeds 6.0 mm, the intrinsic property of the golf ball 2, that is, it is substantially spherical, is lost.

The area s of the dimple 10 is the area surrounded by the edge line in the case the center of the golf ball 2 is observed from infinity (that is, a plane area). The area s can be calculated according to a formula: $s=(Di/2)^2 \times \pi$. The ratio of the total of the area s of all the dimples 10 to the surface area of the virtual sphere 14 is called as an occupation ratio. The occupation ratio is preferably 75% or higher from a viewpoint that a sufficient dimple effect can be obtained.

The volume of the dimple means the volume of the portion surrounded with the plane including the outline of the dimple 10 and the virtual sphere 14. The total volume of the dimples 10 is preferably 250 mm$^3$ or more and 400 mm$^3$ or less. If the total volume is less than 250 mm$^3$, a hopping trajectory may be provided in some cases. If the total volume exceeds 400 mm$^3$, a dropping trajectory may possibly be provided.

In FIG. 3, the distance between the tangent line T and the deepest point P is the depth of the dimple 10. The depth is preferably 0.05 mm or more and 0.60 mm or less. If the depth is less than 0.05 mm, a hopping trajectory may be provides in some cases. On the other hand, if the depth exceeds 0.60 mm, a dropping trajectory may possibly be provided. The total number of the dimples 10 is preferably 200 or more and 500 or less. If the total number is less than 200, the dimple effect is hardly obtained. On the other hand, if the total number exceeds 500, the dimple effect is hardly obtained because the size of the respective dimples 10 is small.

The golf ball of the invention has no particular limitation on the structure, as long as it is a golf ball including a core and a cover covering the core, but a two-piece golf ball having a core and a cover covering the core is preferable.

Next, a preferred embodiment of the core of the golf ball of the present invention will be explained.

The core of the golf ball of the present invention includes a single-layered core, a core consisting of a center and a single-layered intermediate layer covering the core, a core consisting of a center and a plurality of intermediate pieces, or a core consisting of a center and a multi-layered intermediate layers. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the core or the center of the golf ball of the present invention, a conventionally known rubber composition (hereinafter simply referred to as "rubber composition for the core" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent needs to be increased in order to obtain an appropriate hardness, so that the resilience tends to be insufficient.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

As the filler, a filler conventionally formulated in the core of the golf ball may be used. The filler includes, for example, an inorganic salt such as zinc oxide, barium sulfate and calcium carbonate, a high gravity metal powder such as a tungsten powder and a molybdenum powder and the mixture thereof. A content of the filler is preferably 0.5 part by mass or more, more preferably 1 part by mass or more, and is preferably 30 parts by mass or less, more preferably 20 parts by mass or less. If the content is less than 0.5 part by mass, it would be difficult to adjust the gravity, while if the content is more than 30 parts by mass, the ratio of the rubber contained in the whole core becomes low and thus the resilience is lowered.

As the rubber composition for the core, an organic sulfur compound, an antioxidant or a peptizing agent may be blended as appropriate in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro5-bromophenyl)disulfide, and bis(2-cyano-5-bromophenyl)disulfide; a tri-substituted diphenyl disulfide such as bis(2,4,6-trichlorophenyl)disulfide, and bis (2-cyano-4chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis (pentabromophenyl)disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

When preparing a three-piece golf ball or a multi-piece golf ball, as the intermediate layer, for example, a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; a thermoplastic polystyrene elastomer having a commercial name of "RABALON" available from Mitsubishi Chemical Co.; and a thermoplastic polyurethane elastomer having a commercial name of "ELASTOLLAN", for example, "ELASTOLLAN XNY97A" available from BASF Japan may be used in addition to the cured product of the rubber composition and the conventional ionomer resins. Examples of the ionomer resin include an ionomer resin prepared by neutralizing at least a part of carboxyl groups in a copolymer composed of ethylene and $\alpha,\beta$-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms and $\alpha,\beta$-unsaturated carboxylic acid ester with a metal ion, or a mixture thereof.

Specific examples of the ionomer resins are exemplified earlier. The intermediate layer may further contain a gravity adjusting agent such as barium sulfate and tungsten, an antioxidant, a pigment and the like.

The diameter of the core of the golf ball of the present invention is preferably 36.8 mm or more, more preferably 37.2 mm or more, even more preferably 37.6 mm or more, and is preferably 42.2 mm or less, more preferably 41.2 mm or less, even more preferably 40.8 mm or less. If the diameter of the core is less than the above lower limit, the thickness of the cover must be thicker than the desired thickness, so that the resilience is lowered. If the diameter of the core is more than the upper limit, the cover becomes thinner than the desired thickness, and it would become difficult to form the cover.

Further, a compression deformation amount (deformation amount along the shrinkage direction of the core) of the core when applying a load from 98 N as an initial load to 1275 N as a final load is preferably 2.0 mm or more, more preferably 2.1 mm or more, even more preferably 2.3 mm or more and is preferably 5.0 mm or less, more preferably 4.7 mm or less, even more preferably 4.5 mm or less, when the core has a diameter of from 36.8 mm to 42.2 mm. If the above deformation amount is less than 2.0 mm, the shot feeling tends to be lowered, while if the above deformation amount is more than 5.0 mm, the repulsion may be lowered.

It is a preferred embodiment that the core having a surface hardness larger than the center hardness is used. By making the surface hardness of the core larger than the center hardness, a launch angle is increased and an amount of spin is lowered, so that flying distance is improved. From this viewpoint, a difference in the hardness between a surface and a center of the core used for the golf ball the present invention is preferably 10 or more, more preferably 15 or more, and preferably 40 or less, more preferably 35 or less in shore D hardness. If the difference of the hardness is less than the above lower limit, it is difficult to obtain a high launch angle and a low amount of spin, so that the flying distance tends to be lowered. Further, impact strength when hitting the golf ball becomes large so that it is difficult to obtain a good soft shot feeling. On the other hand, if the difference in hardness is more than the above upper limit, the durability tends to be lowered.

The center hardness of the core is preferably 30 or more, more preferably 32 or more, even more preferably 35 or more, and preferably 50 or less, more preferably 48 or less, even more preferably 45 or less in shore D hardness. If the center hardness is less than the above lower limit, the golf ball tends to become so soft that the resilience will be lowered, while if the center hardness is more than the above upper limit, the golf ball becomes so hard that the shot feeling and launch angle become lowered, and the amount of spin also becomes larger so that the flying performance become lowered. In the present invention, the center hardness of the core means the hardness obtained by measuring the central point of the cut surface of the core cut into halves with the Shore D type spring hardness tester.

The surface hardness of the core is preferably 45 or more, more preferably 50 or more, even more preferably 55 or more, and preferably 65 or less, more preferably 62 or less, even more preferably 60 or less in Shore D hardness. If the surface hardness is less than the above lower limit, the golf ball may become too soft, resulting in lowering of resilience and launch angle, or the amount of spin may become too large, resulting in lowering of flying performance. If the surface hardness is larger than the upper limit, the golf ball may become too hard, resulting in lowering of the shot feeling. In the present invention, the surface hardness of the core means the hardness obtained by measuring a surface of the resultant spherical core using the Shore D type spring hardness tester. If the core has a multi layer structure, the surface hardness of the core means a hardness of a surface of the outermost layer of the core.

When preparing a wound-core golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

The golf ball of the present invention preferably has a compression deformation amount (deformation amount along the shrinkage direction of the core) of preferably 2.0 mm or more, more preferably 2.1 mm or more, even more preferably 2.3 mm or more and preferably has a compression deformation amount of 3.5 mm or less, more preferably 3.3 mm or less, even more preferably 3.2 mm or less in the case of having a diameter of 42.67 mm to 43 mm, when a load from 98 N as an initial load to 1275 N as a final load is applied. If the above deformation amount is less than 2.0 mm, the shot feeling tends to be lowered, while if the above deformation amount is more than 3.5 mm, the repulsion may be lowered.

EXAMPLES

Hereinafter, the present invention will be described in more detail with reference to Examples, but the present invention is not restricted by the following Examples and can be suitably modified within the scope described above or below and such modifications are also included in the technical scope of the present invention.

[Evaluation Method]

(1) Abrasion-Resistance

A commercially available pitching wedge was installed on a swing robot available from TRUETEMPER CO., and two points of a ball respectively were hit once at the head speed of 36 m/sec. to observe the portions which were hit. Abrasion-resistance was evaluated and ranked into three levels based on following criteria.

G(Good): Almost no scratch was present on the surface of the golf ball, or slight scratches were present on the surface of the golf ball.

F(Fair): The surface of the golf ball was abraded a little, and scuffing could be observed.

P(Poor): The surface of the golf ball was abraded considerably, and scuffing was conspicuous.

(2) Durability

Each golf ball was repeatedly hit with a metal head driver (W#1) attached to a swing robot manufactured by TRU-ETEMPER CO, at the head speed of 45 m/sec. to make the golf ball collide with a collision board. Times up to which the golf balls are cracked were measured. In addition, each value obtained for golf balls No. 1 to 15 was reduced to an index number relative to the measured value obtained in Golf ball No. 15 being assumed 100. The larger number indicates better durability. For golf balls No. 16 to 25, durability test was conducted 6 times for each golf ball, and average of the actual times up to which the golf ball were cracked were shown.

(3) Slab Hardness (Shore D Hardness)

Using the cover composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD.

(4) Compression Deformation Amount (mm)

The compression deformation amount (amount the golf ball shrinks along the compression direction: mm) of the golf balls or the spherical cores was measured when applying a load from 98 N (10 kgf) as an initial load to 1275 N (130 kgf) as a final load to the golf balls or the cores.

(5) Core Hardness (JIS-C Hardness or Shore D Hardness)

The hardness measured at a surface part of a spherical core using P1-type auto hardness tester equipped with the JIS-C type or Shore D type spring hardness tester specified by JIS K6301, was determined as the surface hardness of the spherical core, and the JIS-C hardness obtained by cutting a spherical core into halves and measuring at a center of the cut surface was determined as the center hardness of the spherical core.

(6) Repulsion Coefficient of Golf Balls

Aluminum cylinder having a weight of 198.4 g was collided with the resultant golf balls No. 16 to No. 25 at the speed of 40 m/sec. to measure the speed of the cylinder and the golf ball before and after the collision. The repulsion coefficient of each golf ball was obtained based on each of the measured speed and weight. Each golf ball was measured 12 times to obtain the average. The repulsion coefficient measured in terms of each golf ball is reduced to an index number relative to the measured value obtained in Golf ball No. 25 whose repulsion coefficient is assumed 100. The higher value of repulsion index indicates higher resilience.

(7) Launch Angle (°), Spin Rate (rpm), and Flight Distance (m)

A #W1 driver with a metal head (manufactured by SRI Sports Ltd, XXIO 4, R shaft, loft 11°) was attached to a swing robot M/C manufactured by Golf Laboratories, Inc. and respective golf balls No. 16 to 25 were hit at a head speed of 40 m/second to measure the launch angle (°) and spin rate (rpm) right after hitting, and the flight distance (distance (m) from the launching point to the stop point). The measurement was carried out 10 times for each golf ball and the average value was defined as the flight distance. The speed and the spin rate of the golf ball right after the hitting were measured by continuously taking photographs of the hit golf ball.

(8) Bending Rigidity (MPa)

The cover compositions were each formed into sheets each having a thickness of about 2 mm by hot press molding and the resulting sheets were maintained at 23° C. for two weeks. The bending rigidity of the sheet was determined according to JIS-K7106.

(9) Resilience

An about 2 mm-thick sheet was produced by heat press molding from each cover composition and 6 sheets of disks with a diameter of 28 mm were punched out of the sheet and stacked to produce a column type test piece with a thickness of about 12 mm and a diameter of about 28 mm. The Lubke type resilience test (test temperature and humidity: 23° C. and 50 RH %) was carried out. The production of each test piece and test method were according to JIS K6255.

(10) Melt Flow Rate (MFR) (g/10 min)

MFR was measured by using a flow tester (Shimadzu Flow Tester CFT-100C, manufactured by Shimadzu Corporation) according to JIS K7210. The measurement was carried out in conditions of a measurement temperature of 190° C. and a load of 2.16 kg.

[Production of Golf Ball]

(1) Production of Core

The rubber composition for a core as shown in the following Table 1 was kneaded and heat pressed at 170° C. for 15 minutes in upper and lower dies each having a hemispherical cavity to obtain a spherical core.

TABLE 1

| | Core | A | B | C |
|---|---|---|---|---|
| Core composition | BR-730 | 100 | 100 | 100 |
| | Zinc acrylate | 29 | 25 | 25 |
| | Zinc oxide | 5 | 5 | Proper amount*) |
| | Dicumyl peroxide | 0.9 | 0.6 | 0.6 |
| | Diphenyl disulfide | 0.5 | — | — |
| | Barium sulfate | Proper amount*) | Proper amount*) | — |
| Physical properties of core | Diameter (mm) | 39.6 | 38.2 | 38.2 |
| | Central hardness (JIS-C) | 63 | 58 | 58 |
| | Surface hardness (JIS-C) | 80 | 75 | 75 |
| | Deformation amount (mm) | 3.65 | 3.45 | 3.7 |

Notes on Table 1
Mixing amount: parts by mass
*)Adjusted to give golf ball weight of 45.4 g depending on the cover composition.
BR730: High-cis polybutadiene (cis content 96% or higher), manufactured by JSR Corporation
Zinc acrylate: ZNDA-90S, manufactured by Nihon Jyoryu Co., Ltd.
Zinc oxide: Ginrei R, manufactured by Toho Zinc Co., Ltd.
Dicumyl peroxide: Percumyl D, manufactured by NOF Corporation.
Diphenyl disulfide: manufactured by Sumitomo Seika Chemicals Co, Ltd.
Barium sulfate: Barium Sulfate BD, manufactured by Sakai Chemical Industry Co., Ltd.

(2) Preparation of Cover Composition and Production of Golf Ball Main Body

Next, the cover materials of the compositions shown in Tables 2 and 3 were respectively mixed by an intermeshing corotation twin screw extruder to obtain a pellet-like cover composition. The following three types of kneading conditions were employed.

For golf balls No. 1 to 15, kneading was conducted under the condition of a screw diameter φ of 32 mm, a screw groove depth difference ratio of 1.6, screw rotation speed of 200 rpm and L/D=44; Each mixture was heated to 150 to 230° C. at a position of dies of the extruder. For golf balls No. 16 to 18, and 24, kneading was conducted under the condition of a screw diameter φ of 44 mm, a screw rotation speed of 300 rpm, extruding temperature of 190° C. (in Table 3, referred to as "kneading condition 1"), and for golf balls No. 19 to 23 and 25, kneading was conducted under the condition of a screw diameter φ of 44 mm, a screw rotation speed of 300 rpm, and an extrusion temperature of 180° C. (in Table 3, referred to as "Kneading condition 2").

Subsequently, the resultant cover composition was injection-molded directly onto the core thus obtained to form the cover covering the core. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball was discharged. The surface of the obtained golf ball body was subjected to sandblast treatment and marking followed by coating a clear paint, drying at the temperature of 40° C. in an oven to dry the paint to obtain a golf ball having a diameter of 42.8 mm and a weight of 45.4 g.

Figure 4:
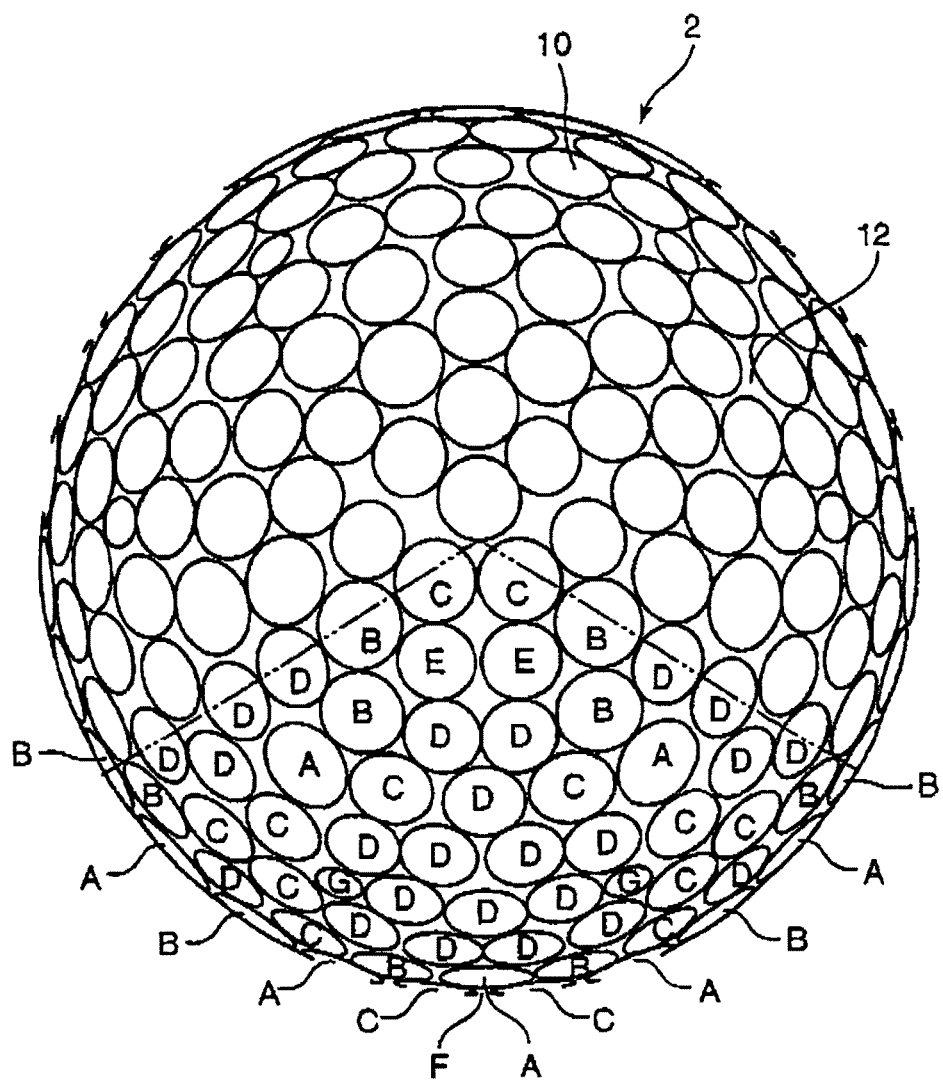
FIG. 4 is a plane view of a dimple pattern formed on a golf ball surface.
Figure 5:
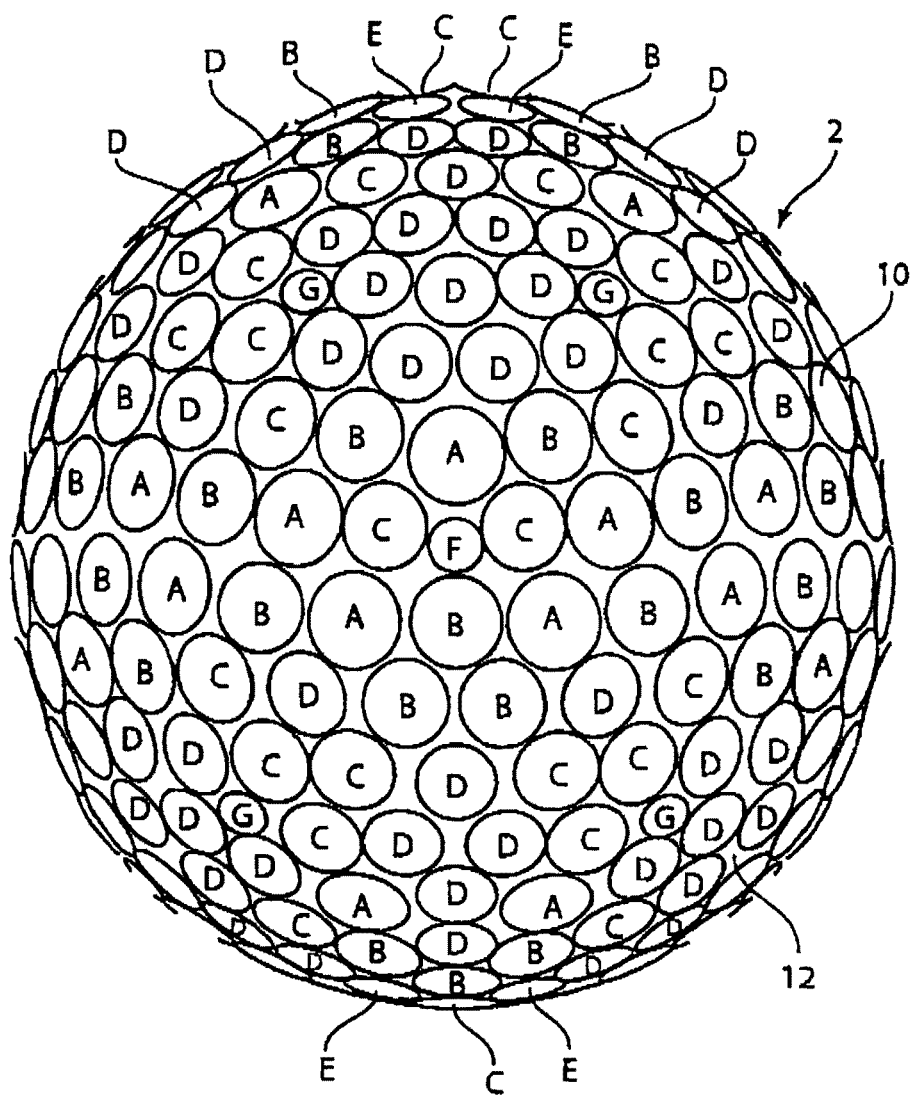
FIG. 5 is a front view of a dimple pattern formed on a golf ball surface.
Figure 6:
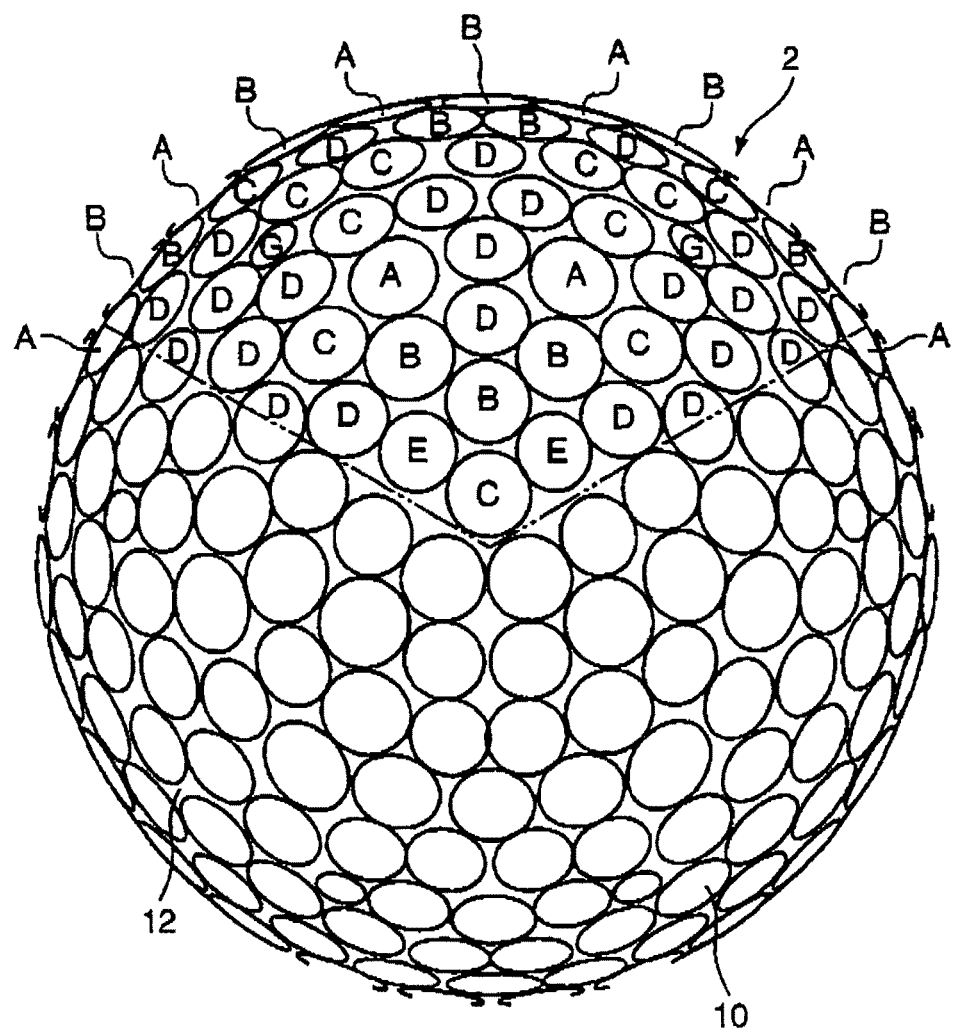
FIG. 6 is a bottom face view of a dimple pattern formed on a golf ball surface.

The dimple patterns shown in Table 4 and FIGS. 3 to 5 were formed on surfaces of the obtained golf balls No. 16 to 25.

The properties of each obtained golf ball were evaluated and the results are shown collectively in Tables.

TABLE 2

| | | | | Golf ball No. | | | | | | | |
|---|---|---|---|---|---|---|---|---|---|---|---|
| | | | | 1 | 2 | 3 | 4 | 5 | 6 | 7 | 8 |
| Cover composition | Mixing | Core type | | A | A | A | A | A | A | A | A |
| | | Resin component (A) | Non-petroleum based polyester resin | 70 | 70 | 70 | 70 | 70 | 100 | 70 | 70 |
| | | | Lacea H100-J | — | — | — | — | — | — | — | — |
| | | | Lacea M-151S Q52 | — | — | — | — | — | — | — | — |
| | | | Celgreen | — | — | — | — | — | — | — | — |
| | | | Himilan 1605 | 15 | 15 | 15 | 15 | — | 15 | 15 | 15 |
| | | | Himilan 1557 | 15 | 15 | 15 | 15 | — | 15 | 15 | 15 |
| | Filler (B) | Type | Kenaf fiber | 3 | 7 | 18 | 22 | 7 | — | — | — |
| | | | Metal oxide | — | — | — | — | — | 10 | — | — |
| | | | Nylon-containing fiber | — | — | — | — | — | — | 10 | — |
| | | | Whisker | — | — | — | — | — | — | — | 10 |
| | | | Average length (μm) | 250 | 250 | 250 | 250 | 250 | 10 | 1000 | 15 |
| | | | Average aspect ratio | 20 | 20 | 20 | 20 | 20 | 25 | 14 | 33 |
| | Compatibilizer | GMA-modified MMA | | 5 | 5 | 5 | 5 | — | 5 | 5 | 5 |
| | | Titanium dioxide | | 4 | 4 | 4 | 4 | 4 | 4 | 4 | 4 |
| Golf ball | Physical properties | Slab hardness (Shore D) | | 56 | 57 | 59 | 61 | 57 | 57 | 58 | 57 |
| | | Bending rigidity (MPa) | | 250 | 310 | 330 | 350 | 300 | 290 | 305 | 320 |
| | | Cover thickness (mm) | | 1.6 | 1.6 | 1.6 | 1.6 | 1.6 | 1.6 | 1.6 | 1.6 |
| | | Compressive deformation amount (mm) | | 3.20 | 3.15 | 3.10 | 2.96 | 3.21 | 3.18 | 3.13 | 3.15 |
| | | Abrasion resistance | | F | G | G | G | G | G | G | G |
| | | Durability | | 140 | 150 | 152 | 108 | 120 | 141 | 125 | 120 |

| | | | | Golf ball No. | | | | | | |
|---|---|---|---|---|---|---|---|---|---|---|
| | | | | 9 | 10 | 11 | 12 | 13 | 14 | 15 |
| Cover composition | Mixing | Core type | | A | A | A | A | B | B | B |
| | | Resin component (A) | Non-petroleum based polyester resin | 70 | 70 | 100 | — | — | — | — |
| | | | Lacea H100-J | — | — | — | — | — | 100 | — |
| | | | Lacea M-151S Q52 | — | — | — | — | 100 | — | — |
| | | | Celgreen | — | — | — | 100 | — | — | — |
| | | | Himilan 1605 | 15 | 15 | — | — | — | — | 60 |
| | | | Himilan 1557 | 15 | 15 | — | — | — | — | 40 |
| | Filler (B) | Type | Kenaf fiber | — | 10 | — | — | — | — | — |
| | | | Metal oxide | — | — | — | — | — | — | — |
| | | | Nylon-containing fiber | — | — | — | — | — | — | — |
| | | | Whisker | 5 | — | — | — | — | — | — |
| | | | Average length (μm) | 15 | 100 | — | — | — | — | — |
| | | | Average aspect ratio | 33 | 5 | — | — | — | — | — |
| | Compatibilizer | GMA-modified MMA | | 5 | 5 | — | — | — | — | — |
| | | Titanium dioxide | | 4 | 4 | 4 | 4 | 4 | 4 | 4 |
| | Physical properties | Slab hardness (Shore D) | | 57 | 57 | 56 | 61 | 76 | 84 | 60 |
| | | Bending rigidity (MPa) | | 260 | 290 | 250 | 280 | Un-measurable* | | 220 |

TABLE 2-continued

| Golf ball | Cover thickness (mm) | 1.6 | 1.6 | 1.6 | 1.6 | 2.3 | 2.3 | 2.3 |
|---|---|---|---|---|---|---|---|---|
| | Compressive deformation amount (mm) | 3.18 | 3.13 | 3.24 | 3.05 | 2.25 | 2.05 | 2.70 |
| | Abrasion resistance | G | G | P | P | F | F | G |
| | Durability | 110 | 110 | 144 | 42 | 1 | 1 | 100 |

Note on table 2:
*Since the sample was too brittle, measurement was impossible.
Non-petroleum based polyester resin: butanediol/succinic acid (non-petroleum based material)/adipic acid copolymerized polyester resin (polybutylene succinate adipate) having the ratio of succinic acid/adipic acid = 80/20 (mass ratio).
Lacea H100-J: poly(lactic acid) resin, manufactured by Mitsui Chemicals, Inc.
Lacea M-151S Q52: a mixture of poly(lactic acid) resin and aliphatic dicarboxylic acid polyester resin, manufactured by Mitsui Chemicals, Inc.
Celgreen: Celgreen CBS 171 (butanediol/succinic acid/caprolactone), all of the components are made of petroleum based materials, manufactured by Daicel Chemical Industries, Ltd.
Himilan 1605; Sodium ion-neutralized ethylene-methacrylic acid copolymer ionomer resin, manufactured by MITSUI-DUPONT POLYCHEMICAL CO., LTD.
Himilan 1557; Zinc ion-neutralized ethylene-methacrylic acid copolymer ionomer resin, manufactured by MITSUI-DUPONT POLYCHEMICAL CO., LTD.
Kenaf fiber: manufactured by Nature Trust
Metal oxide: Panatetra (metal oxide (zinc oxide) having three-dimensional shape), manufactured by Matsushita Electric Industrial Co., Ltd.).
Nylon-containing fiber: Morphotone BM 100C 1000, manufactured by Teijin Fibers, Ltd.
Whisker: Tismo D (potassium titanate ($K_2O$—$8TiO_2$)), manufactured by Otsuka Chemical Co., Ltd.

The golf balls No. 1 to No. 10 were golf balls each comprising a core and a cover covering the core, wherein the cover is formed from a cover composition containing a non-petroleum based polyester resin as a resin component (A) and a needle-like and/or fibrous filler (B), wherein the non-petroleum based polyester resin contains a dicarboxylic acid (a-1) and a diol and/or a hydroxycarboxylic acid (a-2) as a constitutional component, and at least one of the dicarboxylic acid (a-1) and the diol and/or the hydroxycarboxylic acid (a-2) is a non-petroleum based material. It can be understood that these golf balls No. 1 to No. 10 are all improved in the abrasion resistance and durability as compared with the golf ball No. 15 using the ionomer resin used for conventional covers. Additionally, since the filler content in the golf ball No. 4 was not less than 20 parts by mass to 100 parts by mass of the resin component, improvement in the durability was slight. Further, since the average aspect ratio of the filler in the golf ball No. 10 was less than 10, improvement in the durability was slight.

The golf ball No. 11 was a case that no needle-like and/or fibrous filler (B) was contained and it can be understood that although the durability was improved as compared with that of the golf ball No. 15 using the ionomer resin used for conventional covers, the abrasion resistance was considerably lowered. The golf ball No. 12 was a case that polycaprolactone using no non-petroleum based material was used alone as the resin component for the cover and the durability was lowered as compared with that of the golf ball No. 15 using the ionomer resin used for conventional covers. The golf ball No. 13 was a case that a mixture of a poly(lactic acid) resin and an aliphatic dicarboxylic acid polyester resin was used as the resin component for the cover, and no practically usable durability was obtained. The golf ball No. 14 was a case that a poly(lactic acid) resin was used as the resin component for the cover, and similarly to the golf ball No. 13, no practically usable durability was obtained.

TABLE 3

| | | | | | Golf ball No. | | | | | |
|---|---|---|---|---|---|---|---|---|---|---|
| | | | | | 16 | 17 | 18 | 19 | 20 | 21 |
| Cover composition | Mixing | Resin component (A) | (A-1) | Non-petroleum based polyester resin 1 | 60 | 70 | 55 | 42 | 36 | 30 |
| | | | | Non-petroleum based polyester resin 2 | — | — | — | 18 | 24 | 30 |
| | | | (A-2) | Himilan 1555 | 24 | 18 | 27 | 24 | 24 | 24 |
| | | | | Himilan 1557 | 16 | 12 | 18 | 16 | 16 | 16 |
| | | Compatibilizer (C) | (C-1) | Methyl methacrylate-glycidyl methacrylate copolymer | 2 | 2 | 2 | 2 | 2 | 2 |
| | | | (C-2) | Ethylene-glycidyl methacrylate copolymer | 3 | 3 | 3 | 3 | 3 | 3 |
| | | Filler | | Titanium dioxide | 2 | 2 | 2 | 2 | 2 | 2 |
| | | Kneading condition | | | 1 | 1 | 1 | 2 | 2 | 2 |
| | Physical property | | | Slab hardness (JIS-C) | 88 | 87 | 88 | 91 | 91 | 92 |
| | | | | Slab hardness (Shore D) | 60 | 60 | 60 | 61 | 62 | 63 |
| | | | | Bending rigidity (MPa) | 212 | 230 | 210 | 234 | 261 | 260 |
| | | | | Resllience (%) | 58.0 | 57.6 | 57.5 | 55.6 | 54.9 | 56.6 |
| | | | | MFR (g/10 min) | 4.7 | 2.5 | 1.1 | 1.6 | 2.4 | 2.0 |
| Golf ball physical property | | | | Cover thickness (mm) | 2.3 | 2.3 | 2.3 | 2.3 | 2.3 | 2.3 |
| | | | | Surface hardness (JIS-C) | 91 | 92 | 92 | 94 | 94 | 94 |
| | | | | Surface hardness (Shore D) | 63 | 62 | 63 | 67 | 66.3 | 67 |
| | | | | Compression deformation amount (mm) | 3.02 | 3.01 | 3.03 | 2.92 | 2.91 | 2.89 |
| | | | | Repulsion coefficient | 105 | 104 | 105 | 104 | 105 | 105 |
| | | | | Durability (average: times) | 115 | 75 | 121 | 330 | 206 | 190 |
| | | | | Launch angle (°) | 12.9 | 13.0 | 12.8 | 13.2 | 13.5 | 13.5 |

TABLE 3-continued

| | | | | Spin rate (rpm) | 2520 | 2480 | 2510 | 2490 | 2470 | 2475 |
|---|---|---|---|---|---|---|---|---|---|---|
| | | | | Flight distance (m) | 219 | 220 | 218 | 221 | 224 | 224 |

| | | | | | Golf ball No. | | | |
|---|---|---|---|---|---|---|---|---|
| | | | | | 22 | 23 | 24 | 25 |
| Cover composition | Mixing | Resin component (A) | (A-1) | Non-petroleum based polyester resin 1 | 24 | 22 | 60 | 100 |
| | | | | Non-petroleum based polyester resin 2 | 36 | 33 | — | — |
| | | | (A-2) | Himilan 1555 | 24 | 27 | 24 | — |
| | | | | Himilan 1557 | | | | |
| | | Compatibilizer (C) | (C-1) | Methyl methacrylate-glycidyl methacrylate copolymer | 2 | 2 | 2 | — |
| | | | (C-2) | Ethylene-glycidyl methacrylate copolymer | 3 | 3 | — | — |
| | | Filler | | Titanium dioxide | 2 | 2 | 2 | 2 |
| | Kneading condition | | | | 2 | 2 | 1 | 2 |
| | Physical property | | | Slab hardness (JIS-C) | 92 | 92 | 87 | 87 |
| | | | | Slab hardness (Shore D) | 63 | 63 | 60 | 57 |
| | | | | Bending rigidity (MPa) | 263 | 259 | 229 | 223 |
| | | | | Resllience (%) | 56.6 | 55.3 | 54.0 | 57.6 |
| | | | | MFR (g/10 min) | 2.2 | 1.6 | 12.0 | 11.0 |
| Golf ball physical property | | | | Cover thickness (mm) | 2.3 | 2.3 | 2.3 | 2.3 |
| | | | | Surface hardness (JIS-C) | 94 | 94 | 92 | 93 |
| | | | | Surface hardness (Shore D) | 65 | 66 | 63 | 62 |
| | | | | Compression deformation amount (mm) | 2.88 | 2.90 | 3.03 | 3.05 |
| | | | | Repulsion coefficient | 105 | 105 | Unmeasurable* | 100 |
| | | | | Durability (average: times) | 221 | 339 | 1 | 150 |
| | | | | Launch angle (°) | 13.6 | 13.4 | Unmeasurable* | 12.6 |
| | | | | Spin rate (rpm) | 2460 | 2475 | | 2580 |
| | | | | Flight distance (m) | 225 | 223 | | 212 |

*Since cover was broken, measurement was impossible.
Mixing amount: parts by mass Notes on Table 3;

Non-petroleum based polyester resin 1: butanediol/succinic acid (non-petroleum based material)/adipic acid copolymerized polyester resin (polybutylene succiate adipate) having the ratio of succinic acid/adipic acid=80/20 (mass ratio).

Non-petroleum based polyester resin 2; butanediol/succinic acid (non-petroleum based material) copolymerized polyester resin (polybutylene succiate) having the succinic acid content of not less than 50 mass %

Himilan 1555: Sodium ion-neutralized ethylene-methacrylic acid copolymer ionomer resin, manufactured by MITSUI-DUPONT POLYCHEMICAL CO., LTD.

Himilan 1557: Zinc ion-neutralized ethylene-methacrylic acid copolymer ionomer resin, manufactured by MITSUI-DUPONT POLYCHEMICAL CO., LTD.

Methyl methacrylate-glycidyl methacrylate copolymer (Blemmer CP-15, manufactured by NOF Corporation.)

Ethylene-glycidyl methacrylate copolymer: (Bondfast 2C, olefin content 94% by mass, manufactured by Sumitomo Chemical Co., Ltd.)

TABLE 4

| Type | Number | Diameter (mm) | Depth (mm) | Volume (mm³) | Plane view | Front view | Bottom face view |
|---|---|---|---|---|---|---|---|
| A | 42 | 4.65 | 0.135 | 1.148 | FIG. 3 | FIG. 4 | FIG. 5 |
| B | 66 | 4.45 | 0.134 | 1.043 | | | |
| C | 72 | 4.25 | 0.134 | 0.952 | | | |
| D | 126 | 4.05 | 0.134 | 0.864 | | | |
| E | 12 | 3.95 | 0.133 | 0.816 | | | |
| F | 3 | 2.8 | 0.132 | 0.408 | | | |
| G | 12 | 2.65 | 0.132 | 0.365 | | | |

Golf balls No. 16 to 23 were those containing the polar functional group-containing (meth)acrylic type resin (C-1) and the polar functional group-containing olefin type resin (C-2) as the compatibilizer (C). All of golf balls No.16 to 23 had high repulsion coefficients, high launch angle and low spin, and were excellent in flight distance. The golf ball No. 24 was the golf ball containing the polar functional group-containing (meth)acrylic type resin (C-1) alone as the compatibilizer (C). This golf ball No. 24 had a very fragile cover and thus had no durability at a practically usable level and further the repulsion coefficient could not be measured since the cover was cracked at the time of measurement. The golf ball No. 25 was the golf ball containing only the non-petroleum based polyester resin as the resin component (A). This golf ball No. 25 had a low launch angle and high spin and was inferior in the flight distance.

Figure 7:
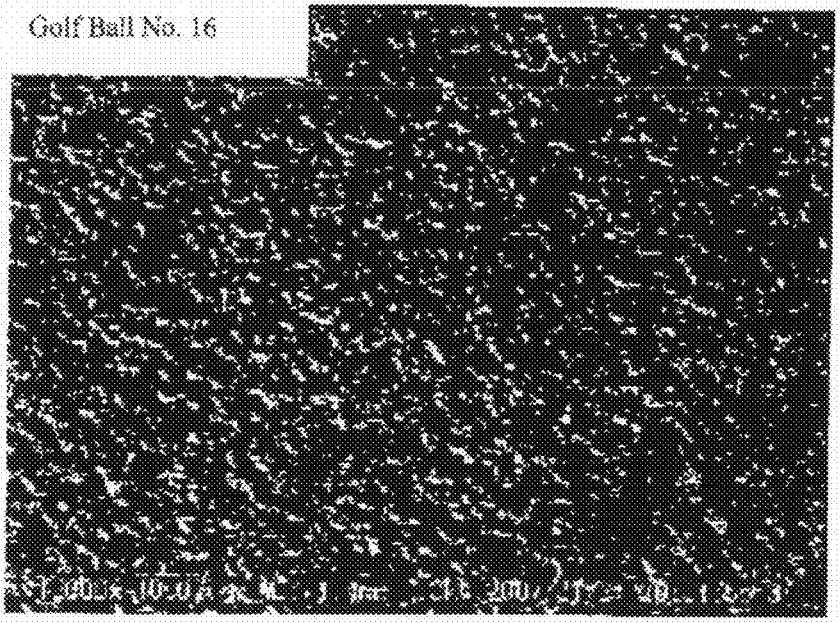
FIG. 7 is a photograph for a drawing showing a dispersion state of respective materials in a cover composition of a golf ball No. 16.
Figure 8:
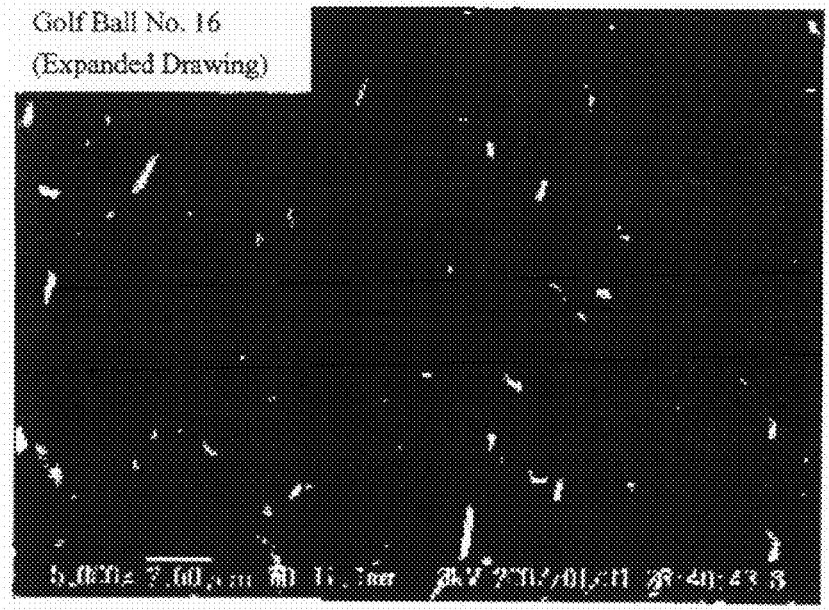
FIG. 8 is an expanded drawing showing a dispersion state of respective materials in the cover composition of the golf ball No. 16 shown in FIG. 7.
Figure 9:
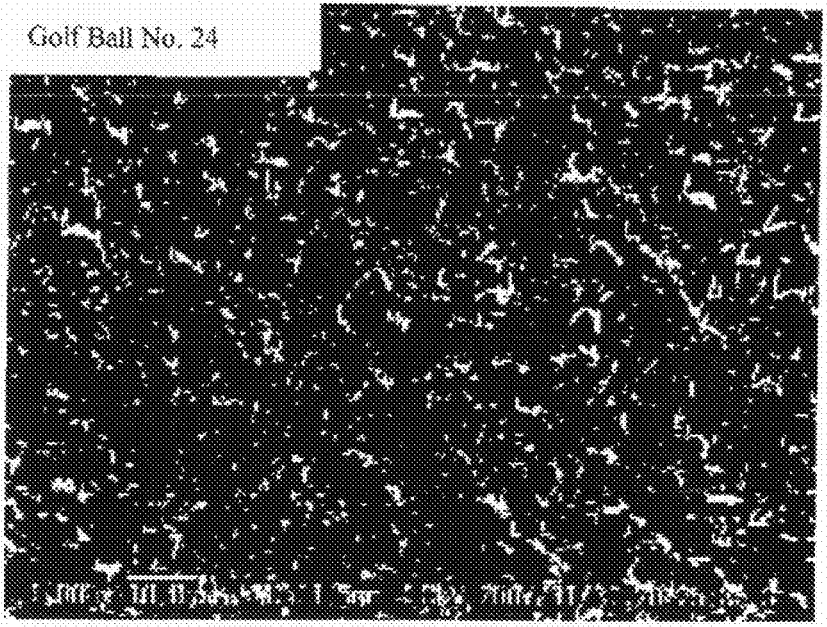
FIG. 9 is a photograph for a drawing showing a dispersion state of respective materials in a cover composition of a golf ball No. 24.
Figure 10:
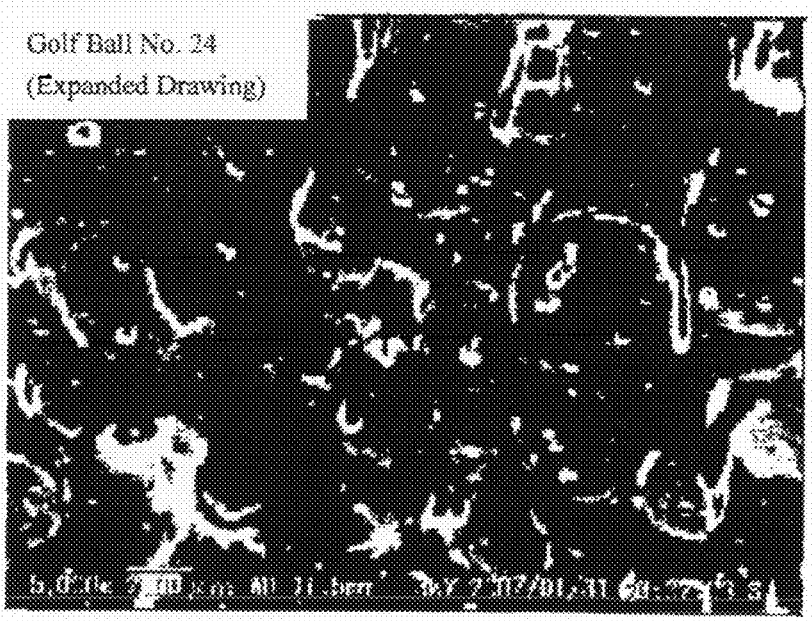
FIG. 10 is an expanded drawing showing a dispersion state of respective materials in the cover composition of the golf ball No. 24 shown in FIG. 9

With respect o the golf ball No. 16 using the polar functional group-containing (meth)acrylic type resin (C-1) and the polar functional group-containing olefin type resin (C-2) as the compatibilizer (C) and the golf ball No. 24 using the polar functional group-containing (meth)acrylic type resin (C-1) alone as the compatibilizer (C), the dispersion states of the respective materials in the cover compositions were observed with a scanning electron microscope (SEM). The results are shown in FIGS. 7 to 10. FIG. 7 shows the dispersion state of the respective materials in the cover composition of the golf ball No. 16. FIG. 8 is an expanded drawing of FIG. 7. FIG. 9 shows the dispersion state of the respective materials in the cover composition of the golf ball No. 24. FIG. 10 is an expanded drawing of FIG. 9.

In comparison of FIG. 7 and FIG. 9, it can be understood that the golf ball No. 16 using two type of compatibilizer is better in the dispersibility of the non-petroleum based polyester resin (A-1) and the petroleum based thermoplastic resin (A-2) in the cover composition than in the golf ball No. 24 using only one kind of compatibilizer and that the respective materials are finely dispersed. As shown in FIGS. 8 and 10, it is made clear that in both cover compositions of the golf balls No. 16 and 24, the petroleum based thermoplastic resin (A-2) is dispersed in a granular state in the non-petroleum based polyester resin (A-1); however, peeling (black portions in the drawing) is observed in the interfaces in the case of the golf ball No. 24 and no peeling is observed in the interfaces in the case of the golf ball No. 16. Accordingly, it can be understood that the interface strength of the golf ball No. 16 using two types of compatibilizer in combination is improved as compared with that of golf ball No. 24.

According to the present invention, the durability and abrasion resistance of a golf ball can be improved. Further, the durability and repulsion property of a golf ball can be improved. This application is based on Japanese Patent application No. 2,007-247,816 filed on Sep. 25, 2007, and No. 2,007-262,650 filed on Oct. 5, 2007, the contents of which are hereby incorporated by reference.

What is claimed is:

1. A golf ball comprising a core and a cover covering the core, wherein the cover is formed from a cover composition containing
a non-petroleum based polyester resin and an ionomer resin as a resin component (A) and
a needle-like and/or fibrous filler (B),
wherein
the cover composition has a bending rigidity of 600 MPa or less;
the non-petroleum based polyester resin contains a dicarboxylic acid (a-1) and a diol and/or a hydroxycarboxylic acid (a-2) as a constituent component, and at least one of the dicarboxylic acid (a-1) and the diol and/or the hydroxycarboxylic acid (a-2) is a non-petroleum based material; and
the needle-like and/or fibrous filler (B) has an average aspect ratio of from 10 to 100 and comprises at least one fibrous filler selected from the group consisting of kenaf, cotton, flax, sheep's wool, silk, feathers, nylon fibers, vinylon fibers, acrylic fibers, polyester fibers, polyolefin fibers, and polyurethane fibers.

2. The golf ball according to claim 1, wherein the needle-like and/or fibrous filler (B) has an average length of 1 μm to 2000 μm.

3. The golf ball according to claim 1, wherein the golf ball has a compression deformation amount of 2.0 mm or more and 3.2 mm or less.

4. The golf ball according to claim 1, wherein the needle-like and/or fibrous filler (B) has an average length of 250 μm or less.

5. The golf ball according to claim 1, wherein the cover is formed from said cover composition which is kneaded by using a biaxial extruder having a screw depth difference of 1.6 or higher.

6. The golf ball according to claim 1, wherein the cover composition comprises 1 to 20 parts by mass of the needle-like and/or fibrous filler (B) with respect to 100 parts by mass of the resin component (A).

7. The golf ball according to claim 1, wherein the cover is formed from a cover composition further containing an ionomer resin as a resin component (A) and a compatibilizer.

8. The golf ball according to claim 7, wherein the non-petroleum based polyester resin includes a polybutylene succinate adipate whose succinic acid component is a non-petroleum based material.

9. The golf ball according to claim 7, wherein the non-petroleum based polyester resin includes a polybutylene succinate whose succinic acid component is a non-petroleum based material.

* * * * *